United States Patent [19]

Ichikawa et al.

[11] Patent Number: 5,430,437
[45] Date of Patent: Jul. 4, 1995

[54] TRANSMISSION AND RECEPTION OF PAGER SIGNALS WITHOUT USELESS SAMPLING OPERATION

[75] Inventors: Yoshio Ichikawa; Yoshikazu Takayama, both of Tokyo, Japan

[73] Assignee: NEC Corporation, Tokyo, Japan

[21] Appl. No.: 261,201

[22] Filed: Jun. 15, 1994

Related U.S. Application Data

[63] Continuation of Ser. No. 22,860, Feb. 25, 1993, abandoned, which is a continuation of Ser. No. 656,648, Feb. 19, 1991, abandoned.

[30] Foreign Application Priority Data

Feb. 19, 1990 [JP] Japan .................................. 2-38884
Mar. 15, 1990 [JP] Japan .................................. 2-65406

[51] Int. Cl.⁶ ............................................................ H04Q 1/00
[52] U.S. Cl. .............................. 340/825.44; 455/38.3; 455/343
[58] Field of Search ............... 340/825.44; 455/38.3, 455/343

[56] References Cited

U.S. PATENT DOCUMENTS

| | | | |
|---|---|---|---|
| 4,663,623 | 5/1987 | Lax et al. | 340/825.44 |
| 4,736,461 | 4/1988 | Kawasaki et al. | 455/343 |
| 4,802,240 | 1/1989 | Yamaguchi et al. | |
| 4,857,917 | 8/1989 | Sato | 455/343 |
| 4,903,335 | 2/1990 | Shimizu | 455/343 |
| 5,010,330 | 4/1991 | Snowden et al. | 455/343 |

FOREIGN PATENT DOCUMENTS 0319219 6/1989 European Pat. Off. .
0427158 5/1991 European Pat. Off. .

OTHER PUBLICATIONS

Nachrichtentechniche Berichte, No. 6, Oct. 1989, Backnang DE, pp. 35-44, Sechenkel et al, 'Cityruf Leistungsmermale und Systemkonzept'*p. 38, right column, line 10—p. 39, right column, line 8; figure 4 *.

Primary Examiner—Donald J. Yusko
Assistant Examiner—Brian Zimmerman
Attorney, Agent, or Firm—Sughrue, Mion, Zinn, Macpeak & Seas

[57] ABSTRACT

In a pager receiver for receiving first through N-th pager signals successively at a first predetermined period (T1) and comprising a battery saving switch and a receiving circuit connected to the switch and enabled while the switch is in an on state, a controller puts the switch in the on state repeatedly at a second predetermined period (T2) to make the receiving circuit receive at least a portion of a preamble signal (PA) and whole of a synchronization (SS) and an address (AS) signals of the first pager signal (RS1) and detect an address signal end of the first pager signal. The controller keeps the switch in the on state to make the receiving circuit receive at least a part of the preamble signal and whole of the synchronization and the address signals of each of the second (RS2) through the N-th pager signals and detect the address signal end of each of the second through the N-th pager signals. The controller puts the switch in the off state from detection of the address signal end of each signal of the first through the N-th pager signals until lapse of a preselected duration (D3) from reception of the synchronization signal of the each signal.

8 Claims, 15 Drawing Sheets

TRANSMISSION AND RECEPTION OF PAGER SIGNALS WITHOUT USELESS SAMPLING OPERATION

This is a continuation of Ser. No. 08/022860, filed Feb. 25, 1993, now abandoned, which is a continuation of Ser. No. 07/656648, filed Feb. 2, 1991, now abandoned.

BACKGROUND OF THE INVENTION

This invention relates to a pager receiver for receiving pager signals and a control station for transmitting the pager signals. Such a pager receiver and a control station are particularly useful in a radio communication network.

A pager receiver of the type described intermittently receives the pager signals. Each of the pager signals comprises a preamble signal having a preamble duration, a synchronization signal succeeding the preamble signal and having a synchronization duration, and an address signal succeeding the synchronization signal and having an address duration which is variable from the address signal to another address signal. The address signal may comprise a call number signal representative of a call number and a message signal representative of a message.

A control station is connected between a telephone network and a base station which has a service area in which the pager receiver can receive the pager signals. The control station comprises a processing circuit supplied with call information from the telephone network for processing the call information into processed signals to make the base station transmit the processed signals as the pager signals.

A recent remarkable development of an integrated circuit technique has rendered the pager receiver compact or portable and multifunctional. Preferably, the pager receiver has a long life. Inasmuch as a battery is used as a power source in the pager receiver, the pager receiver has a life time dependent upon the life of the battery. Therefore, electric power must not be wasted in the pager receiver. In other words, useless operation should strictly be restricted. For this purpose, a battery saving operation is carried out in such a pager receiver during nonreception of the pager signals.

In order to carry out the battery saving operation, the pager receiver comprises a battery saving switch having an on state and an off state. The pager receiver further comprises a switch operating circuit for putting the switch selectively in the on and the off states and a receiving circuit connected to the battery saving switch and enabled while the battery saving switch is put in the on state.

According to a conventional battery saving operation, the switch operating circuit puts the battery saving switch in the on state repeatedly at a predetermined time period shorter than the preamble duration to make the receiving circuit receive at least a portion of the preamble signal. Such an operation is called a sampling operation in the art. When the preamble signal is detected, the switch operating circuit keeps the battery saving switch in the on state until an end of the address signal to make the receiving circuit receive whole of the synchronization and the address signals. From the end of the address signal, the switch operating circuit puts the battery saving switch in the off state and then puts the battery saving switch in the on state repeatedly at the predetermined time period. It is to be noted here that the sampling operation is repeated between the pager signals at the predetermined period shorter than the preamble duration.

The conventional battery saving operation has, therefore, an insufficient battery saving efficiency because the sampling operation is repeated between the pager signals. In particular, the sampling operation may be useless at night because a small number of calls is given to the pager receiver at the night.

SUMMARY OF THE INVENTION

It is therefore an object of this invention to provide a pager receiver capable of reducing a time duration of useless sampling operation.

It is another object of this invention to provide a control station capable of producing pager signals particularly useful in the pager receiver of the type described above.

Other object of this invention will become clear as the description proceeds.

On describing the gist of a first aspect of this invention, it is possible to understand that a method comprises the steps of transmitting and receiving call information as address signals in first and second through N-th pager signals arranged successively at a first predetermined period, where N represents an integer which is not less than two. Each of the address signals has a signal end and an address duration ending at the signal end.

According to the first aspect of this invention, the transmitting step of the above-understood method comprises the steps of consecutively arranging in the predetermined period a preamble duration, a synchronization duration, and an address including duration which is longer than the address duration, generating a preamble signal having the preamble duration and a synchronization signal having the synchronization duration, processing the call information into the address signals, and arranging the preamble and the synchronization signals and each of the address signals consecutively in the preamble, the synchronization, and the address including durations collectively as each of the pager signals.

The receiving step of the above-understood method comprises the steps of generating a timing signal indicative of the first predetermined period putting a battery saving switch into an on state repeatedly at a second predetermined period shorter than the preamble duration to enable a receiving circuit to receive at least a portion of the preamble signal of the first pager signal, keeping the switch in the on state, after reception of said portion, to enable the receiving circuit receive the synchronization and the address signals of the first pager signal and detect the signal end, putting the switch in an off state from detection of the signal end of the address signal of the first pager signal until lapse of a preselected duration from reception of the synchronization signal of the first pager signal, putting the switch momentarily in the on state after lapse of the preselected duration to enable the receiving circuit receive at least a part of each signal of the second through the N-th pager signals, keeping the switch in the on state, after reception of the part, to enable the receiving circuit receive the synchronization and the address signals of the each signal and detect the signal end of the address signal of the each signal, and putting the switch in the off state from detection of the signal end of the address signal until lapse of the preselected duration from reception of the synchronization signal of the each signal.

On describing the gist of a second aspect of this invention, it is possible to understand that a method comprises the steps of transmitting and receiving call information as address signals in first through (L−1)-th and L-th through N-th pager signals arranged successively at a predetermined period, where (L−1) represents a first integer which is not less than about ten, and where (N-L) representing a second integer which is not less than one. Each of the address signals having a signal end and an address duration ending at the signal end.

According to the second aspect of this invention, the transmitting step of the above-understood method comprises the steps of consecutively arranging in the predetermined period a preamble duration, a synchronization duration, and an address including duration which is not shorter than the address duration, generating a preamble signal having the preamble duration and a synchronization signal having the synchronization duration, processing the call information into the address signals, and arranging the preamble and the synchronization signals and each of the address signals consecutively in the preamble, the synchronization, and the address including durations collectively as each of the pager signals.

The receiving step of the above-understood method comprises the steps of putting a battery saving switch into an on state to enable a receiving circuit to receive the synchronization signal of each signal of the first through the (L−1)-th pager signals as received signals and detect the signal end of the address signal of the each signal and to use the received signals in determining a determined period as the predetermined period, putting the switch in an off state from detection of the signal end of the address signal of said (L−1)-th pager signal until lapse of a first time interval from detection of the synchronization signal of the (L−1)-th pager signal, putting the switch in the on state during a second time interval immediately following the first time interval to make the receiving circuit receive the synchronization and the address signals of each pager signal of the L-th through the N-th pager signals and detect the signal end of the address signal of the each pager signal, and putting the switch in the off state from detection of the signal end of the address signal of the each pager signal until lapse of the first time interval from detection of the synchronization signal of the last-mentioned each pager signal.

On describing the gist of a third aspect of this invention, it is possible to understand that a pager receiver is for receiving first and second through N-th pager signals successively at a first predetermined period where N represents an integer which is not less than two. Each of the pager signals comprises a preamble signal having a preamble duration, a synchronization signal succeeding the preamble signal and having a synchronization duration, and an address signal succeeding the synchronization signal and having an address signal end and an address duration ending at the address signal end. A sum of the preamble, the synchronization, and the address durations is shorter than the first predetermined period. The receiver includes a battery saving switch having an on state and an off state and a receiving circuit connected to the switch and enabled while the switch is in the on state.

According to the third aspect of this invention, the receiver comprises switch operating means connected to the receiving circuit and the switch for putting the switch in the on state repeatedly at a second predetermined period shorter than the preamble duration to make the receiving circuit receive at least a portion of the preamble signal and whole of the synchronization and the address signals of the first pager signal and detect the address signal end of the first pager signal. The switch operating means keeps the switch in the on state to make the receiving circuit receive at least a part of the preamble signal and whole of the synchronization and the address signals of each of the second through the N-th pager signals and detect the address signal end of each of the second through the N-th pager signals. The switch operating means puts the switch in the off state from detection of the address signal end of each signal of the first through the N-th pager signals until lapse of a preselected duration from reception of the synchronization signal of the each signal.

On describing the gist of a fourth aspect of this invention, it is possible to understand that a pager receiver is for receiving first through (L−1)-th and L-th through N-th pager signals successively at a predetermined period where (L−1) represents a first integer which is less than about ten, and where (N-L) represents a second integer which is not less than one. Each of the first through the N-th pager signals comprises a preamble signal having a preamble duration, a synchronization signal succeeding the preamble signal and having a synchronization duration, and an address signal succeeding the synchronization signal and having an address signal end and an address duration ending at the address signal end. A sum of the preamble, the synchronization, and the address durations is not longer than the predetermined period. The receiver includes a battery saving switch having an on state and an off state and a receiving circuit connected to the switch and enabled while the switch is in the on state.

According to the fourth aspect of this invention, the receiver comprises preparing means connected to the receiving circuit and the switch for preparing the receiving circuit for its operation by putting the switch in the on state to make the receiving circuit receive the synchronization signals of the first through the (L−1)-th pager signals as received signals and detect the address signal end of the (L−1)-th pager signals and to use the received signals in determining the predetermined period. The preparing means putting the switch in the off state from detection of the address signal end of the (L−1)-th pager signal until lapse of a first time interval from detection of the synchronization signal of the (L−1)-th pager signal. The receiver further comprises switch operating means connected to the receiving circuit, the switch, and the preparing means for putting the switch in the on state during a second time interval immediately following the first time interval to make the receiving circuit receive the synchronization and the address signals of each of signal of the L-th through the N-th pager signals and detect the address signal end of the each signal. The switch operating means puts the switch in the off state from detection of the address signal end of the each signal until lapse of the first time interval from reception of the synchronization signal of the each signal.

On describing the gist of a fifth aspect of this invention, it is possible to understand that a control station is for use between a telephone network and a base station. The control station comprises a processing circuit supplied with call information from the telephone network for processing the call information into processed signals to make the base station transmit the processed signals as pager signals.

According to the fifth aspect of this invention, the processing circuit comprises a memory for memorizing the call information as memorized information, an information processor connected to the memory for processing the memorized information into processed information, a timer for timing a predetermined period, and control means connected to the information processor and the timer for controlling the information processor to make the information processor transmit the processed information to the base station as the processed signals successively at the predetermined period.

DESCRIPTION OF THE PREFERRED EMBODIMENTS

Figure 1:
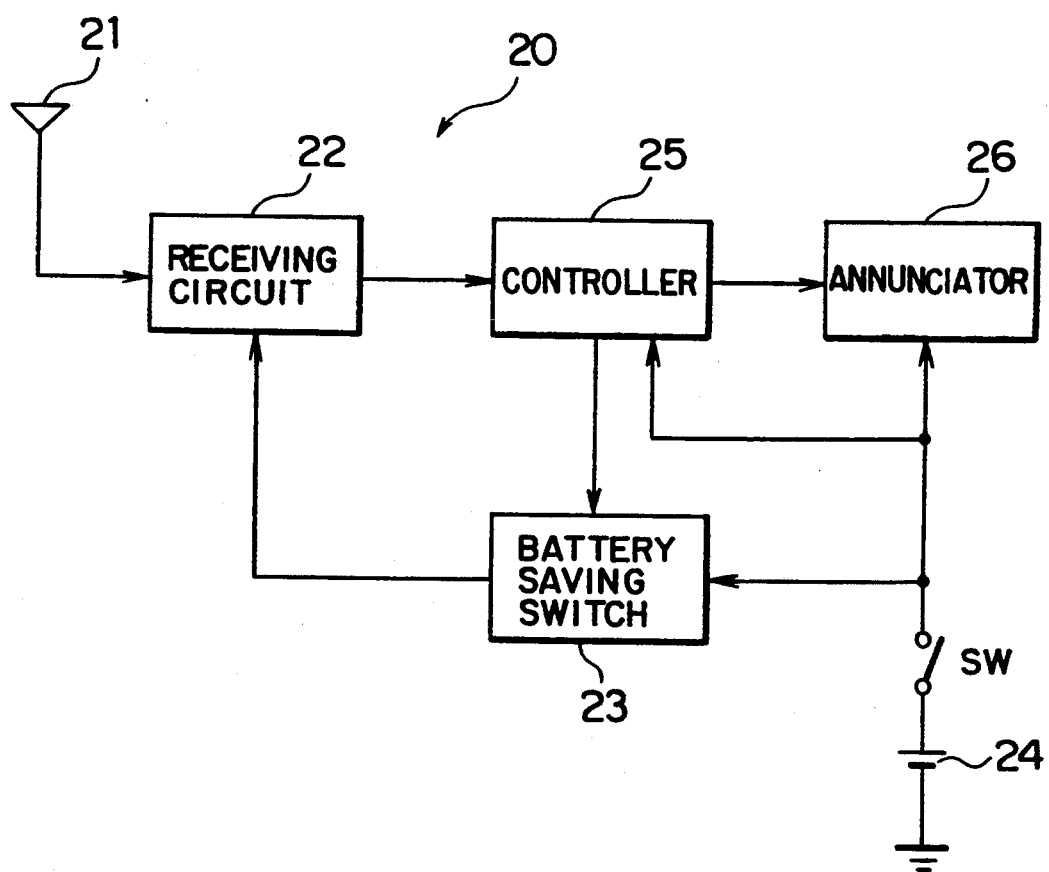
FIG. 1 is a block diagram of a conventional pager receiver.

Referring to FIG. 1, a conventional pager receiver will be described at first in order to facilitate an understanding of the present invention. According to the prior art, a pager receiver 20 comprises an antenna 21, a receiving circuit 22 for receiving pager signals through the antenna 21, and a battery saving switch 23 connected to a battery 24 through a power switch SW. The battery saving switch 23 has an on state and an off state. The receiving circuit 22 receives the pager signals as reception pager signals while the battery saving switch 23 is in the on state. The receiving circuit 22 supplies the reception pager signals to a controller 25. The controller 25 is adapted to decide whether or not the reception pager signals contain an address signal which is directed to the pager receiver 20. Such a decision operation is called an address decision operation. If the reception pager signals contain the address signal directed to the pager receiver 20, the controller 25 energizes a speaker or annunciator 26. The controller 25 serves as a switch operating circuit for carrying out a battery saving operation which will shortly be described.

Figure 2:
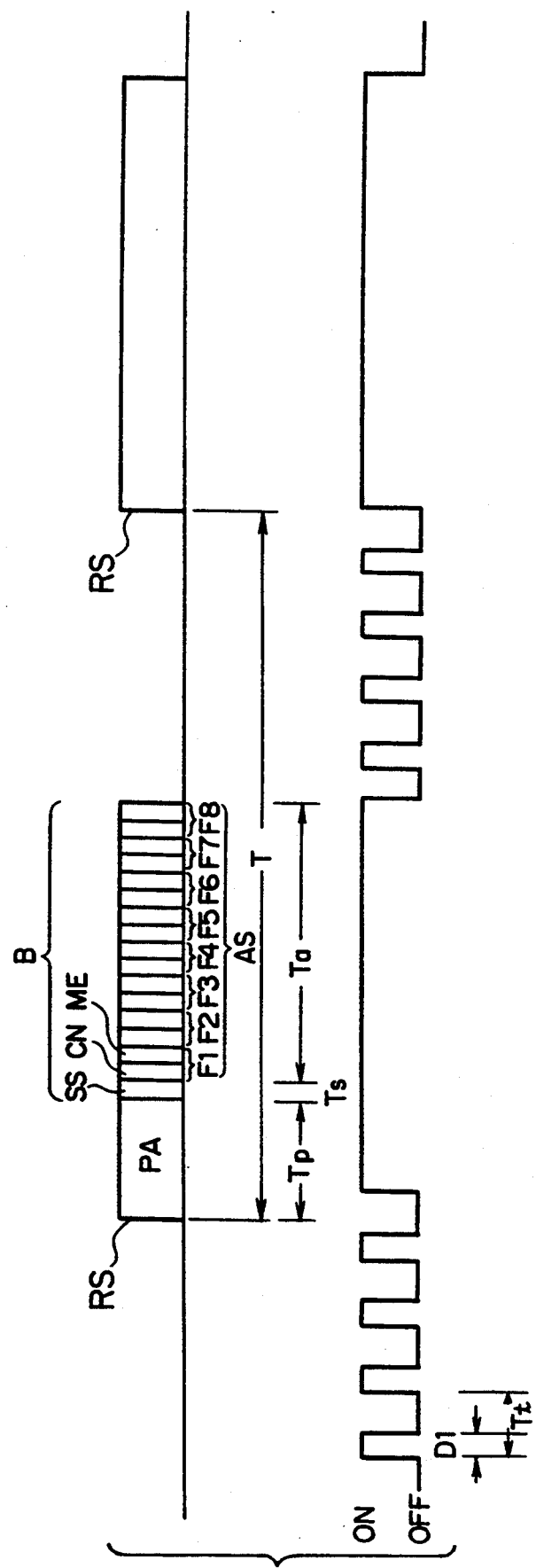
FIG. 2 is a time chart for use in describing a battery saving operation of the pager receiver illustrated in FIG. 1.

Turning to FIG. 2, the pager signals are indicated at RS along a top line. Each of the pager signals RS is a POCSAG code signal which is set up in CCIR recommendation 584. The pager signals RS are intermittently transmitted by a base station (later shown). Generally, a time interval T between the pager signals RS is variable.

Each of the pager signals RS carries a preamble signal PA and a batch B succeeding the preamble signal PA. The preamble signal PA has a preamble duration Tp equal to, for example, an eighteen-code word length when a unit codeword consists of, for example, 32 bits. The preamble signal PA is specified by a repetition of pulses which are of logic "1" and "0" levels. The batch B consists of, for example, seventeen codewords. Other batches may succeed the illustrated batch B within the time interval T although only one combination of the preamble signal PA and the batch B is depicted in the time interval T.

The batch B comprises a frame synchronization signal SS and first through eighth frames F1 to F8. The frame synchronization signal SS succeeds the preamble signal PA. The frame synchronization signal SS has a synchronization duration Ts equal to, for example, a one-codeword length and is specified by a predetermined pattern of bits. The first through the eighth frames F1 to F8 successively succeed the synchronization signal SS. Each of first through the eighth frames F1 to F8 has a two codeword length. The first through the eighth frames F1 to F8 consist of first through eighth call number signals and first through eighth message signals.

The first through the eighth call number signals are different from each other and may be grouped into first through eighth groups. The first through eighth groups are assigned to the first through the eighth frames F1 to F8, respectively. In the top line of FIG. 1, the first call number signal and the first message signal are symbolized typically at CN and ME, respectively. Each of the first through the eighth call number signals and the first through the eighth message signals has a one-codeword length. The first through the eighth frames F1 to F8 will collectively be called an address signal which is depicted at AS. The address signal AS has an address signal end and an address duration ending at the address signal end.

As illustrated along a second line, the preamble signal PA has a preamble duration depicted at Tp. The synchronization and the address signals SS and AS have a synchronization duration and an address duration depicted at Ts and Ta, respectively. A sum of the preamble, the synchronization, and the address durations is shorter than the time interval T.

Turning back to FIG. 1 and referring to a third and a fourth or bottom line of FIG. 2, the controller 25 puts the battery saving switch 23 in the on state during a first time duration D1 in a time period Tt and repeatedly at the time period Tt to make the receiving circuit 22 receive at least a portion of the preamble signal PA. In such an operation, the controller 25 carries out detection of the preamble signal PA. The operation is called a sampling operation. On detection of the portion of the preamble signal PA, the controller 25 keeps the on state of the battery saving switch 23 until detection of the address signal end. On detection of the address signal end, the controller 25 puts the battery saving switch 23 in the off state and then returns to the sampling operation. Namely, the controller 25 puts the battery saving switch 23 in the on state repeatedly at the time period Tt to make the receiving circuit 22 receive a portion of a next one of the paging signals RS. Thus, the sampling operation is repeated between the pager signals RS.

Figure 3:
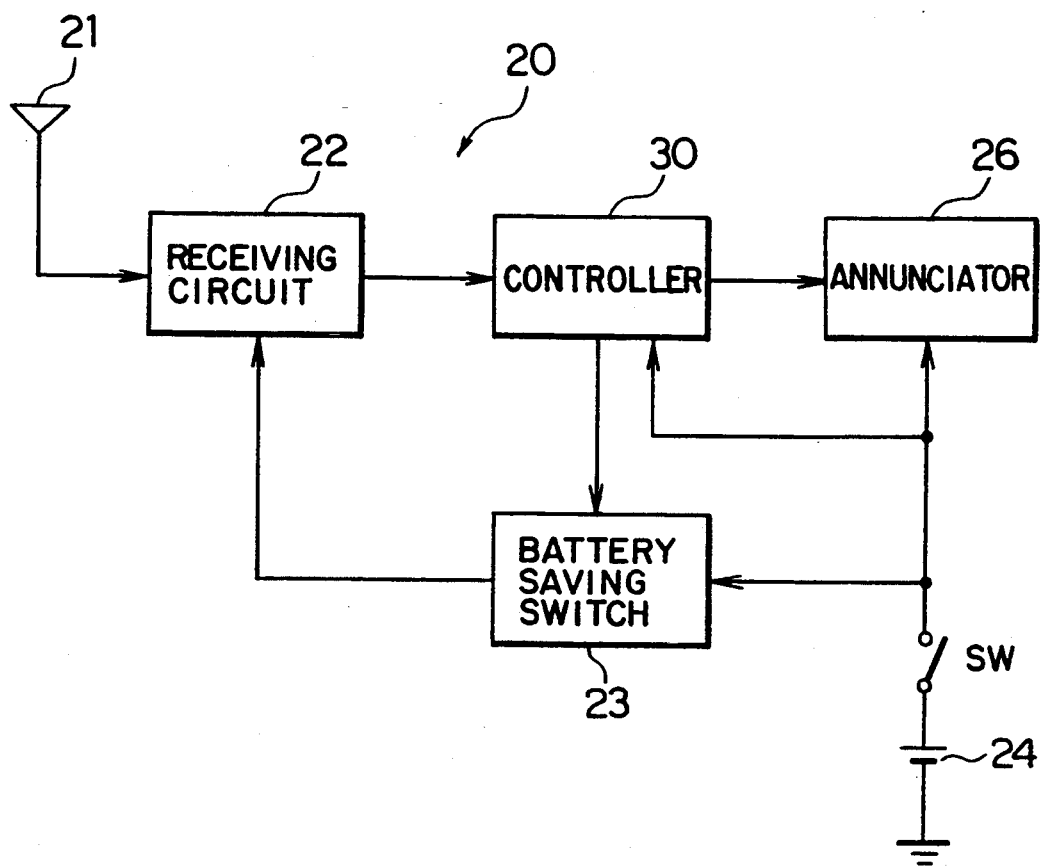
FIG. 3 is a block diagram of a pager receiver according to a first embodiment of this invention.

Referring to FIG. 3, a pager receiver according to a first embodiment of this invention is similar to that illustrated in FIG. 1 and comprises similar parts designated by like reference numerals. A controller 30 carries out the address decision operation in the manner mentioned above. The controller 30 comprises a read only memory (not shown) memorizing a battery saving operation program for carrying out the battery saving operation and comprises a random access memory (not shown). The controller 30 carries out time count operation as will later be described.

Figure 4:
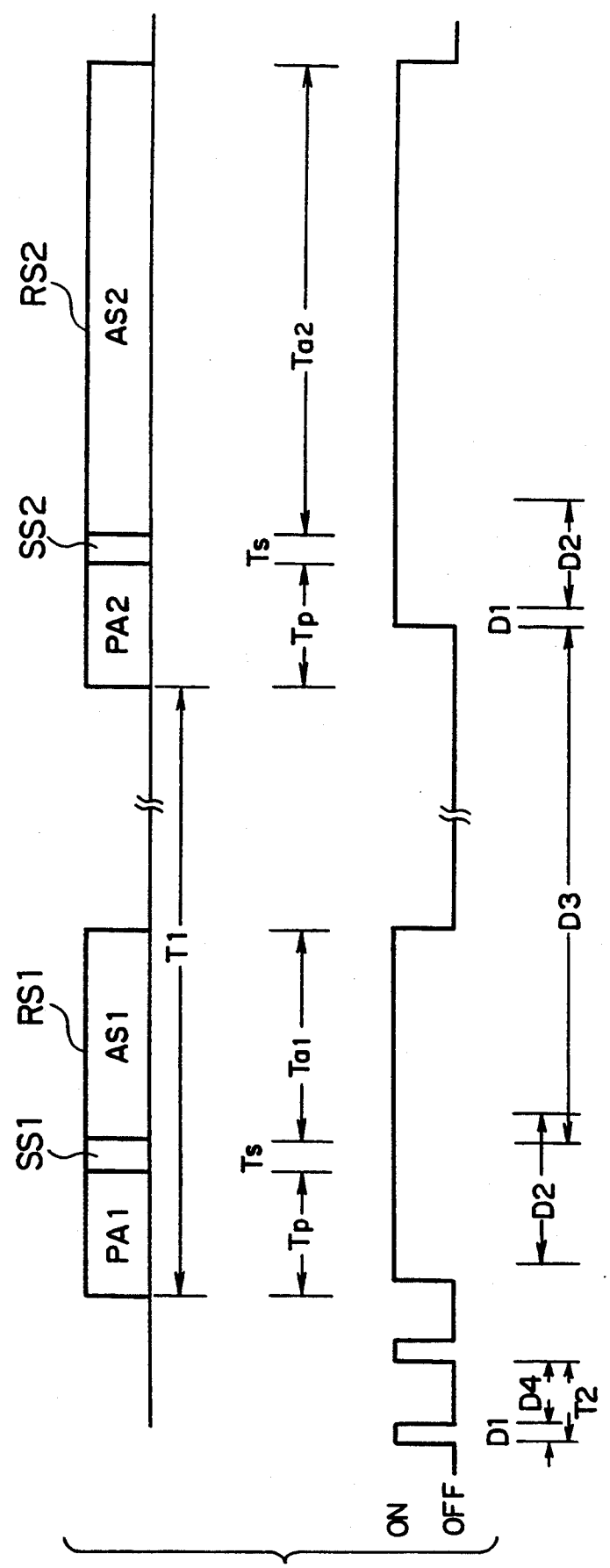
FIG. 4 is a time chart for use in describing a battery saving operation of the pager receiver illustrated in FIG. 3.

Referring to FIG. 4 together with FIG. 3, a battery saving operation will be summarized. It will be assumed that the pager receiver 20 receives first through N-th pager signals successively at a first predetermined time period T1 when the power switch SW is turned from the off state to the on state. The first and the second pager signals are indicated at RS1 and RS2 along a top line of FIG. 4. The first pager signal RS1 comprises a first preamble signal depicted at PA1, a first synchronization signal depicted at SS1, and a first address signal depicted at AS1. Similarly, the second pager signal RS2 comprises a second preamble signal depicted at PA2, a second synchronization signal depicted at SS2, and a second address signal depicted at AS2.

As illustrated along a second line of FIG. 4, each of the first and the second preamble signals PA1 and PA2 has the preamble duration Tp. Each of the first and the second synchronization signals SS1 and SS2 has the synchronization duration Ts. Let the first and the second address signals AS1 and AS2 consist of a single batch and two batches, respectively. In this event, the first address signal AS1 has a first address duration Ta1 and the address signal end depicted by a right-most vertical line outlining the address signal AS1. The second address signal AS2 has a second address duration Ta2 equal to twice the first address duration Ta1.

As illustrated along a third line of FIG. 4, the controller 30 carries out sampling operation from a time instant at which the power switch SW is closed. Namely, the controller 30 puts the battery saving switch 23 in the on state during the first time duration D1 in a second predetermined time period T2 and repeatedly at the second predetermined period T2 to make the receiving circuit 22 receive at least a portion of the first preamble signal PA1. When the receiving circuit 22 receives at least the portion of the first preamble signal PA1, the controller 30 can detect the first preamble signal PA1. On detection of the first preamble signal PA1, the controller 30 keeps the battery saving switch 23 in the on state during a second time duration and detects the first synchronization signal SS1. The second time duration is illustrated along a fourth line of FIG. 4 at D2 and is longer than the synchronization duration Ts. The second time duration may be called a prescribed duration.

When the first synchronization signal SS1 is detected, the controller 30 keeps the switch 23 in the on state until detection of the address signal end of the first address signal AS1. On detection of the address signal end, the controller 30 puts the battery saving switch 23 in the off state until lapse of a preselected time duration from detection of the first synchronization signal SS1. The preselected time duration will be called a third time duration. The third time duration is illustrated along the fourth line at D3 and is shorter than the first predetermined time period T1. More specifically, the third time duration D3 is represented by an equation given by:

$$D3 \neq T1 - (Tp - Ts/2).$$

At an end of the third time duration, the controller 30 puts the battery saving switch 23 in the on state during the first time duration D1 to make the receiving circuit 22 receive a part of the second preamble signal PA2. When the controller 30 detects the second preamble signal PA2, the controller 30 keeps the on state during the second time duration D2 and detects whether or not the second synchronization signal SS2 is detected within the second time duration D2. When the second synchronization signal SS2 is detected within the second time duration D2, the controller 30 keeps the switch 23 in the on state until detection of the address signal end of the second address signal AS2. On detection of the address signal end, the controller 30 puts the battery saving switch 23 in the off state until lapse of the third time duration D3 from detection of the second synchronization signal SS2. Thus, useless sampling operation is omitted.

Figure 5:
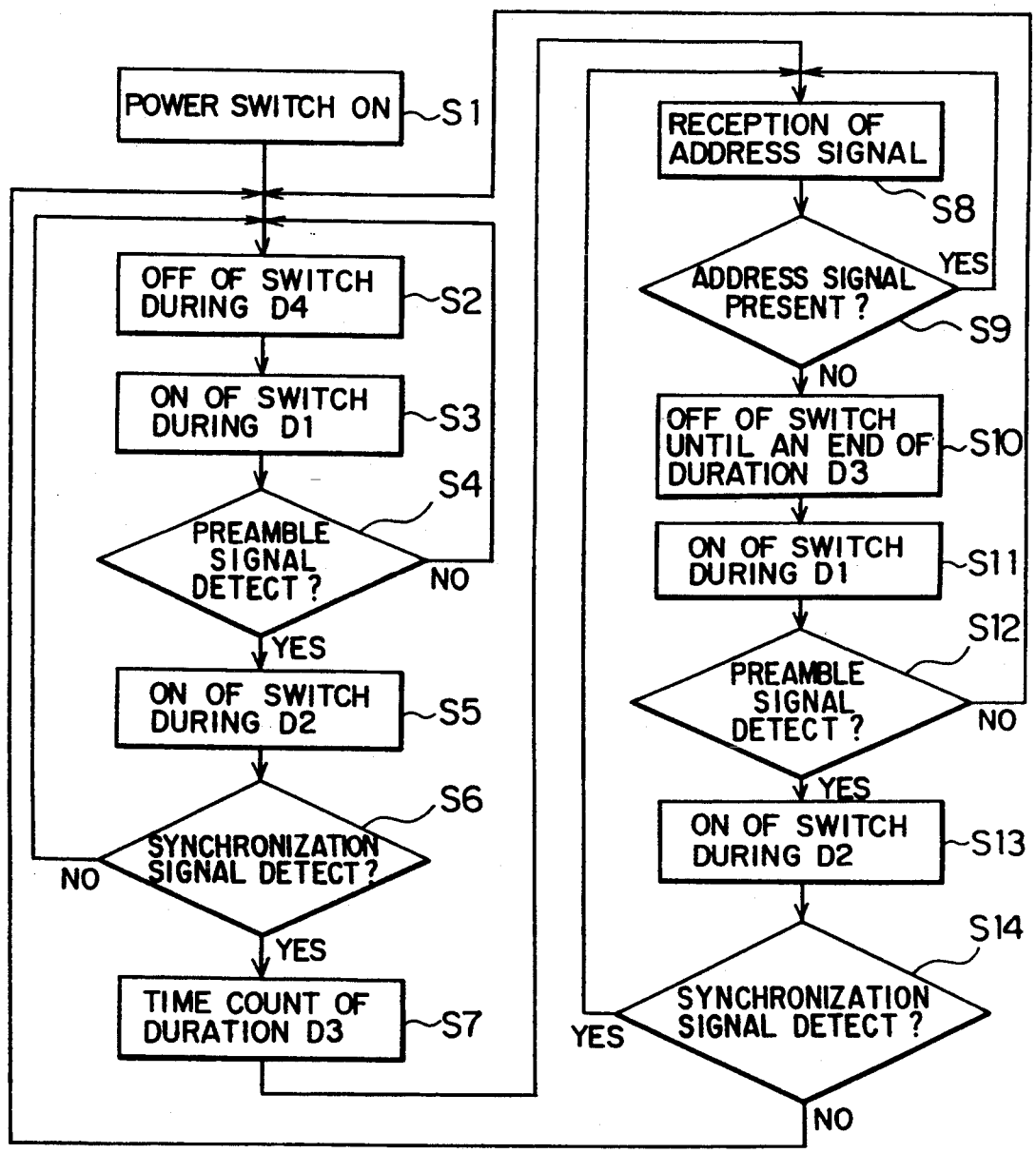
FIG. 5 is a flow chart for use in describing operation of a controller of the pager receiver illustrated in FIG. 3.

Referring to FIG. 5 together with FIGS. 3 and 4, the description will proceed to the battery saving operation.

At a first stage S1, the battery saving operation starts when the power switch SW is turned from the off state to the on state.

At a second stage S2 following the first stage S1, the controller 30 puts the battery saving switch 23 in the off state during a fourth time duration D4 which is equal to an algebraic sum of the second predetermined time period T2 minus the first time duration D1.

At a third stage S3, the controller 30 puts the battery saving switch 23 in the on state during the first time duration D1 immediately following the fourth time duration D4.

At a fourth stage S4, the controller 30 judges whether or not the first preamble signal PA1 is detected within the first time duration D1. If the first preamble signal PA1 is not detected within the first time duration D1, operation turns back to the second stage S2. When the first preamble signal PA1 is detected within the first time duration D1, operation proceeds to a fifth stage S5. The second through the fourth stages S2 to S4 are for putting the battery saving switch 23 in the on state repeatedly at the second predetermined time period T2 to make the receiving circuit 22 receive at least the above-mentioned portion of the preamble signal of the first pager signal and produce a first preamble detection signal. .The second through the fourth stages S2 to S4 are for carrying out the sampling operation and may collectively be called a first partial switch operating unit.

At the fifth stage S5, the controller 30 keeps the switch 23 in the on state during the second time duration D2 immediately following the first time duration D1.

At a sixth stage S6, the controller 30 decides whether or not the first synchronization signal SS1 is detected within the second time duration D2. When the first synchronization signal SS1 is not detected within the second time duration D2, operation turns back to the second stage S2. If the first synchronization signal SS1 is detected within the second time duration D2, operation proceeds to a seventh stage S7. The fifth and the sixth stages S5 and S6 are for putting the switch 23 in the on state during the second time duration D2 from production of the first preamble detection signal and for producing a first synchronization detection signal. The fifth and the sixth stages S5 and S6 may collectively be called a second partial switch operating unit. The second through the sixth stages S2 to S6 may collectively be called a first battery saving operation.

At the seventh stage S7, the controller 30 starts the time count operation of the third time duration D3. The seventh stage S7 may be called a timer.

At an eighth stage S8, the controller 30 starts reception operation of the first address signal AS1.

At a ninth stage S9, the controller 30 determines whether or not the first address signal AS1 is present. In other words, the controller 30 detects the address signal end of the first address signal AS1. If the first address signal AS1 is present, operation turns back to the eighth stage S8. When either the first address signal AS1 is absent or the controller 30 detects the address signal end of the first address signals AS1, the controller 30 puts the switch 23 in the off state. Thus, operation proceeds to a tenth stage S10. The eighth and the ninth stages S8 and S9 are for putting the battery saving switch 23 in the on state to make the receiving circuit 22 receive the address signal AS1 of the first pager signal RS1, detect the address signal end of the first pager signal, and produce a first end detection signal. The eighth and the ninth stages S8 and S9 may collectively be called a third partial switch operating unit.

At the tenth stage S10, the controller 20 keeps the off state of the battery saving switch 23 until an end of the third time duration D3. The tenth stage S10 is for keeping the switch 23 in the off state from reception of the first end detection signal until lapse of the third time duration T3 which is timed by using the first synchronization detection signal. The tenth stages S10 may be called a fourth partial switch operating unit.

At an eleventh stage S11, the controller 30 puts the switch 23 in the on state during the first time duration D1 immediately following the third time duration D3.

At a twelfth stage S12, the controller 30 decides whether or not the second preamble signal PA2 is detected within the first time duration D1. When the second preamble signal PA2 is not detected, operation turns back to the second stage S2. If the second preamble signal PA2 is detected, operation proceeds to a thirteenth stage S13. The eleventh and the twelfth stages S11 and S12 are for putting the switch 23 in the on state during the first time duration D1 to make the receiving circuit 22 receive at least a part of the preamble signal of each pager signal of the second through the N-th pager signals and produce a second preamble detection signal. The eleventh and the twelfth stages S11 and S12 may collectively be called a fifth partial switch operating unit.

At the thirteenth stage S13, the controller 30 keeps the switch 23 in the on state during the second time duration D2.

At a fourteenth stage S14, the controller 30 decides whether or not the second synchronization signal SS2 is detected within the second time duration D2. When the second synchronization signal SS2 is detected, operation turns back to the eighth stage S8. The thirteenth and the fourteenth stages S13 and S14 are for putting the switch 23 in the on state during the second time duration D2 from reception of the second preamble detection signal to make the receiving circuit 22 receive whole of the synchronization and the address signals of the each pager signal and produce a second synchronization detection signal and a second end detection signal. The thirteenth and the fourteenth stages S13 and S14 may collectively be called a sixth partial switch operating unit.

At the eighth stage S8, the controller 30 starts reception operation of the second address signal AS2. At the ninth stage S9, the controller 30 decides whether or not the second address signal AS2 is present. If the first address signal AS2 is present, operation turns back to the eighth stage S8. When the second address signal AS2 is absent, the controller 30 puts the switch 23 in the off state. Then, operation proceeds again to the tenth stage S10. The tenth stage S10 is for keeping the switch 23 in the off state from production of the second end detection signal until lapse of the third time duration D3 which is timed by using the second synchronization detection signal. In this stage of operation, the tenth stage S10 may be referred to afresh as a seventh partial switch operating unit.

If the second synchronization signal SS2 is not detected at the fourteenth stage S14, operation turns back to the second stage S2. At the second stage S2 following the fourteenth stage S14, the controller 30 puts the switch 23 in the off state during the fourth time duration D4.

At the third stage S3, the controller 30 puts the switch 23 in the on state during the first time duration D1.

At the fourth stage S4, the controller 30 judges whether or not the third preamble signal is detected within the first time duration D1. If the third preamble signal is not detected within the first time duration D1, operation turns back to the second stage S2. When the third preamble signal is detected within the first time duration D1, operation proceeds again to the fifth stage S5. The second through the fourth stages S2 to S4 are for putting the switch 23 in the on state repeatedly at the second predetermined time period T2 if no preamble signal is received when the battery saving switch 23 is put intermittently in the on state during the first time duration D1. The second through the fourth stages S2 to S4 may collectively be referred to anew as an eighth partial switch operating unit.

According to the example being illustrated, the pager receiver has an excellent battery saving efficiency because the useless sampling operation is reduced. It should be noted here that the battery saving efficiency becomes higher in proportion to an increment of the first predetermined time period T1. Furthermore, the battery saving operation is useful when a small number of calls is given to the pager receiver 20.

Figure 6:
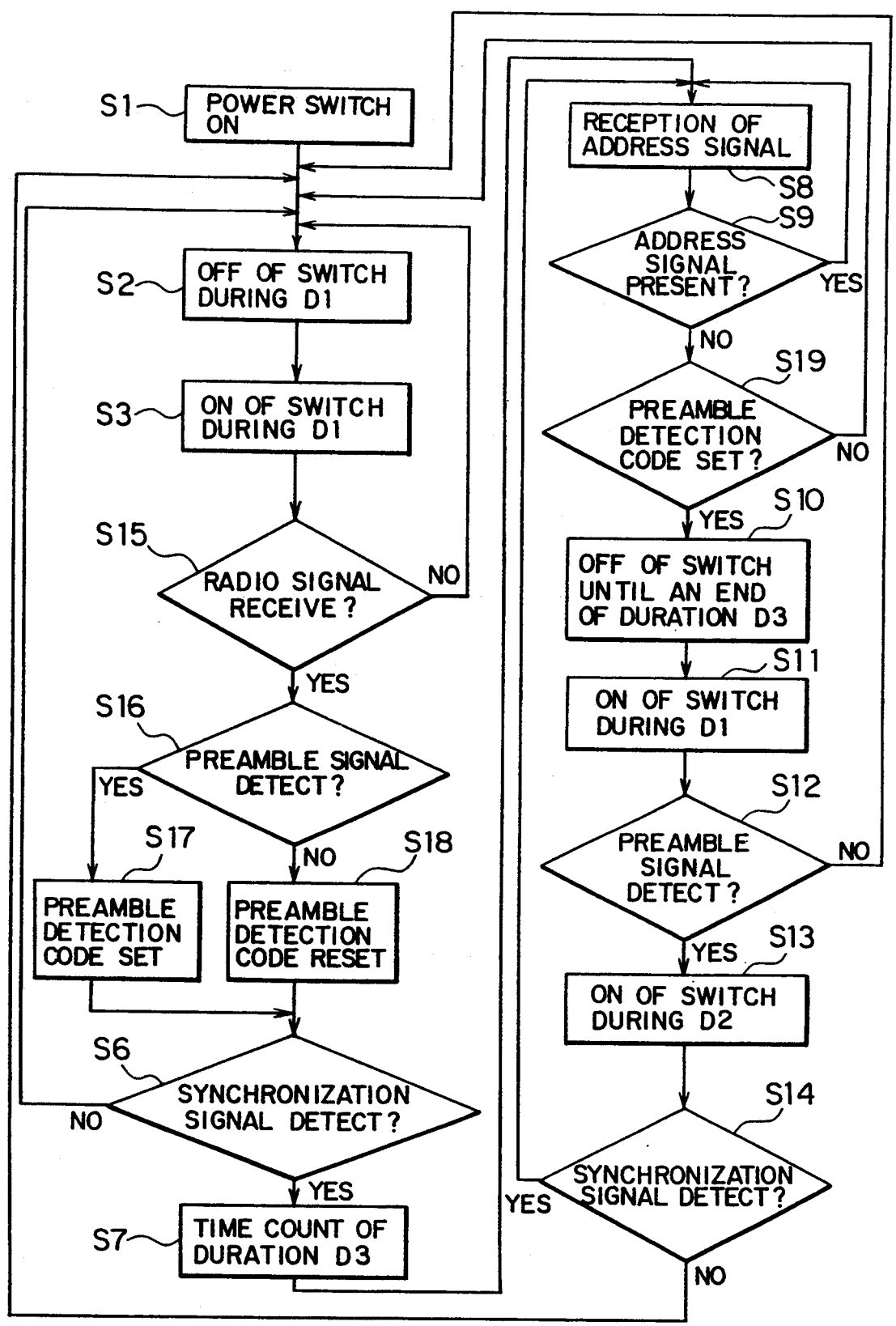
FIG. 6 is a flow chart for use in describing another operation of the controller mentioned in conjunction with FIG. 5.

Referring to FIG. 6 together with FIG. 3, the description will be made as regards another battery saving operation which can detect the synchronization signal even when no preamble signal is detected. The other battery saving operation is also useful in a pager receiver of another type. Such a pager receiver is disclosed in U.S. Pat. No. 4,837,854 issued to Takashi Oyagi and another and assigned to the instant assignee.

The other battery saving operation is similar to that illustrated in FIG. 5 except that a fifteenth through eighteenth stages S15 to S18 are substituted between the third and the sixth stages S3 and S6 for the fourth and the fifth stages S4 and S5 and a nineteenth stage S19 added between the ninth and the tenth stages S9 and S10. In the example being illustrated, the random access memory has a flag code area (not shown) for memorizing a specific flag code as will shortly be described.

At the third stage S3, the controller 30 puts the battery saving switch 23 in the on state during the first time duration D1.

At the fifteenth stage S15, the controller 30 decides whether or not the receiving circuit 22 receives a radio signal which may carry the pager signals. When the receiving circuit 22 does not receive the radio signal, operation turns back to the second stage S2. If the receiving circuit 22 receives the radio signal as a reception radio signal, operation proceeds to a sixteenth stage S16.

At the sixteenth stage S16, the controller 30 judges whether or not the reception radio signal is the preamble signal. If the reception radio signal is the preamble signal, operation proceeds to a seventeenth stage S17. When the reception radio signal is not the preamble signal, operation proceeds to the eighteenth stage S18.

At the seventeenth stage S17, the controller 30 sets a preamble detection code represented by logic "1" level, as the specific flag code, in the flag code area. Subsequently, operation proceeds to the eighteenth stage S18.

At the eighteenth stage S18, the controller 30 erases the preamble detection code of the flag code area.

Then, the sixth through the ninth stages S6 to S9 are successively carried out as described in conjunction with FIG. 5.

At the nineteenth stage S19, the controller 30 decides whether or not the preamble detection code is set in the flag code area. When the preamble detection code is not set in the flag code area, operation turns back to the second stage S2. If the preamble detection code is set in the flag code area, operation proceeds to the tenth stage S10. Thereafter, the tenth through the fourteenth stages S10 to S14 are successively carried out as described in conjunction with FIG. 5.

Figure 7:
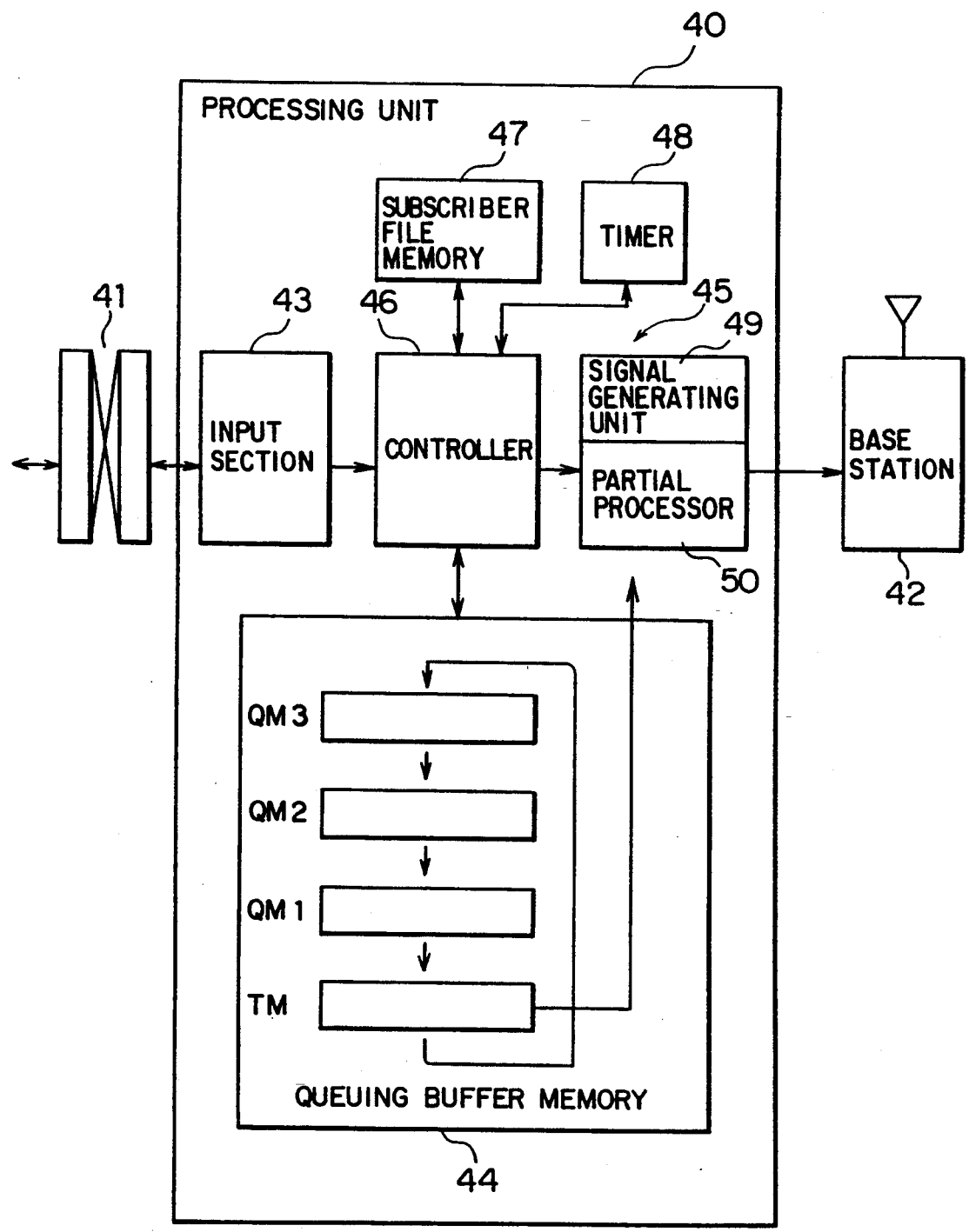
FIG. 7 is a block diagram of a control station according to a second embodiment of this invention.

Referring to FIG. 7, the description will proceed to a control station which is useful for the pager receiver described in conjunction with FIGS. 3 to 5. In the brief description of the drawing, the control station is said to be according to the third embodiment of this invention. The control station comprises a processing unit 40 between a telephone network 41 and a base station 42. The processing unit 40 is supplied with call information from the telephone network 41 and processes the call information into processed signals. The base station 42 is for successively transmitting the processed signals as the pager signals carried by a radio signal. The call information may comprise a call number signal and a message signal. The call number signal represents a call number. The message signal represents a message.

The processing unit 40 comprises an input section 43 for receiving the call information. A queuing buffer memory 44 is for memorizing the call information as memorized information. An information processor 45 is for processing the memorized information into processed information. A controller 46 is for controlling the input section 43, the queuing buffer memory 44, and the information processor 45. The processing unit 40 further comprises a subscriber file memory 47 preliminarily memorizing a plurality of subscriber numbers, and a timer 48 for timing a preamble duration, a synchronization duration, and an address including duration successively in a predetermined time period T to produce a time-out signal. The address including duration is what should be referred to more exactly as an address signal including duration. The information processor 45 comprises a signal generating unit 49 for generating a preamble signal having a first duration and a synchronization signal having a second duration and a partial processor 50 for processing the memorized information into address signals. Each of the address signals has a variable duration as an address duration which immediately follows the synchronization duration and is shorter than the address including duration. The first and the second durations are equal to the preamble and the synchronization durations described in conjunction with FIG. 2, respectively.

The queuing buffer memory 44 comprises first through third queuing memory areas QM1, QM2, and QM3 and a transferring memory area TM. Each of the first through the third queuing memory areas QM1 to QM3 and the transferring memory area TM has a memory capacity capable of memorizing a maximum number of batches which can be produced within the first predetermined time period T1. The queuing buffer memory 44 further comprises a flag memory area (not shown) for memorizing a flag code for indicating whether the queuing buffer memory 44 is full or vacant. The flag code is set in a busy state by a logic "1" level when all of the first through the third queuing memory areas QM1 to QM3 and the transferring memory area TM are full.

Figure 8:
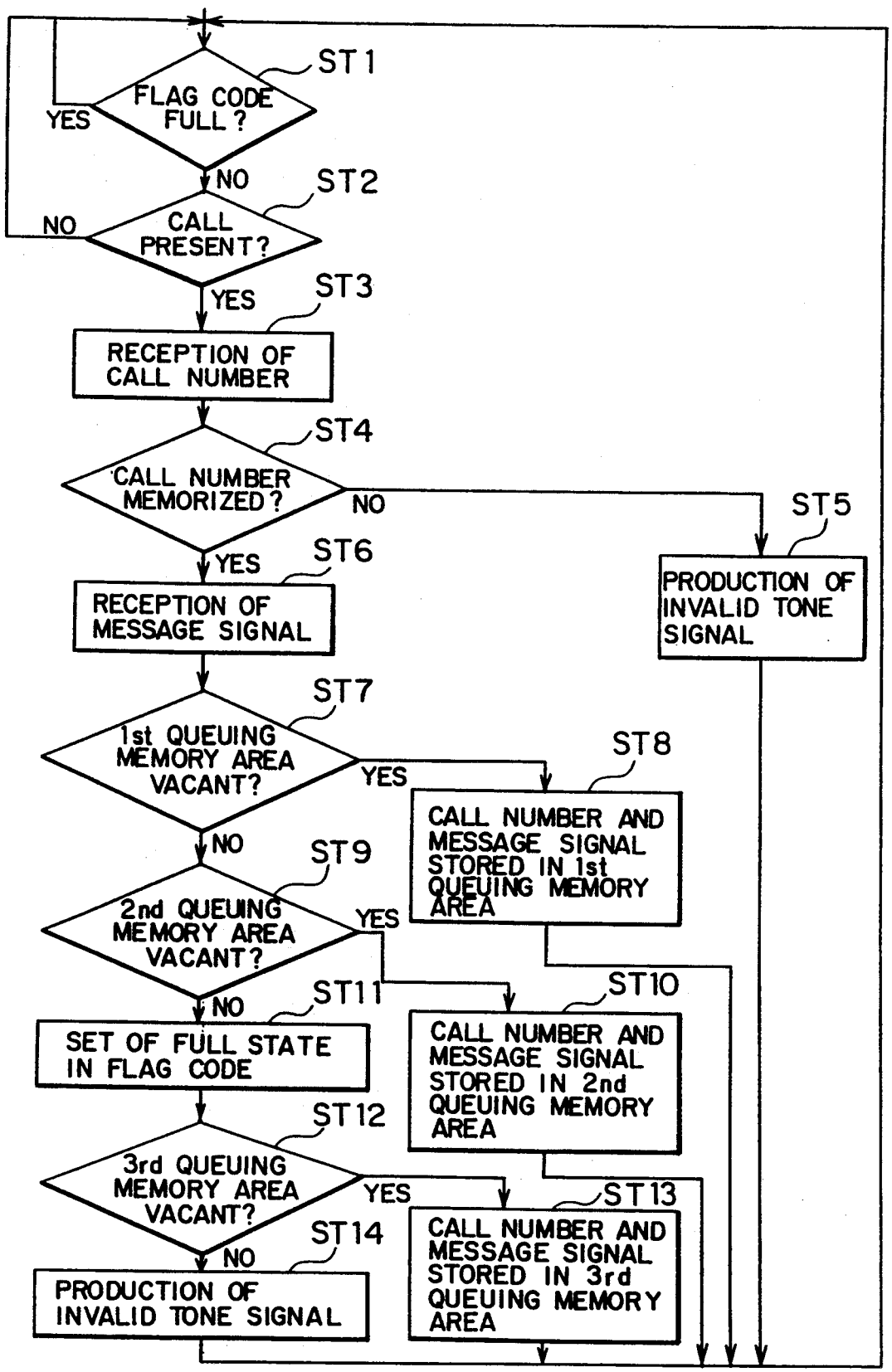
FIG. 8 is a flow chart for use in describing control operation carried out by a controller of a processing unit illustrated in FIG. 7.

Referring to FIG. 8 together with FIG. 7, the description will proceed to reception operation of the call information. The reception operation is carried out by the controller 46 in cooperation with the input section 43 and the queuing buffer memory 44.

At a first stage ST1 of the reception operation, the controller 46 detects whether or not the flag code indicates the busy state. When the flag code indicates the busy state, the first stage ST1 is repeated. If the flag code does not indicate the busy state but the vacant state, operation proceeds to a second stage ST2.

At the second stage ST2, the controller 46 detects whether or not a call is represented by the call information. When the call is present, operation turns back to the first stage ST1. If the call is absent, operation proceeds to a third stage ST3.

At the third stage ST3, the input section 43 receives the call information as reception call information.

At a fourth stage ST4, the controller 46 receives the call number of the reception call information as a received call number and decides whether or not the received call number is memorized in the subscriber file memory 47. When the received call number is not memorized in the subscriber file memory 47, operation proceeds to a fifth stage ST5. If the received call number is memorized in the subscriber file memory 47, operation proceeds to a sixth stage ST6.

At the fifth stage ST5, the controller 46 controls the input section 43 to make the input section 43 supply an invalid tone signal back to the telephone network 41. As well known in the art, the invalid tone signal is for informing that the call is invalid. Supplied with the invalid tone signal, the telephone network 41 delivers an invalid tone to a subscriber (not shown) in the manner known in the art. Subsequently, operation turns back to the first stage ST1. This means that the call is rejected.

At the sixth stage ST6, the controller 46 receives the message signal of the call information as a received message signal.

At a seventh stage ST7, the controller 46 decides whether or not the first queuing memory area QM1 has a vacant area. If the first queuing memory area QM1 has the vacant area, operation proceeds to an eighth stage ST8. When the first queuing memory area QM1 has no vacant area, namely, the first queuing memory area QM1 is full, operation proceeds to a ninth stage ST9.

At the eighth stage ST8, the controller 46 stores the received call number and the received message signal in the first queuing memory area QM1. Subsequently, operation turns back to the first stage ST1.

At the ninth stage ST9, the controller 46 decides whether or not the second queuing memory area QM2 has a vacant area. If the second queuing memory area QM2 has the vacant area, operation proceeds to a tenth stage ST10. When the second queuing memory area QM2 has no vacant area, operation proceeds to an eleventh stage ST11. When the second queuing memory area QM2 is full, the control station may be regarded as being in a congestion state of calls. In this event, if the controller 46 accepts a new call, the control station falls into a degraded service. Accordingly, the new call should be rejected as will shortly be described.

At the tenth stage ST10, the controller 46 stores the received call number and the received message signal in the second queuing memory area QM2. Subsequently, operation turns back to the first stage ST1.

At the eleventh stage ST11, the controller 46 sets the flag code in the busy state. As a result, the new call is rejected at the first stage ST1.

At a twelfth stage ST12, the controller 46 decides whether or not the third queuing memory area QM3 has a vacant area. If the third queuing memory area QM3 has the vacant area, operation proceeds to a thirteenth stage ST13. When the third queuing memory area QM3 has no vacant area, operation proceeds to a fourteenth stage ST14.

At the thirteenth stage ST13, the controller 46 stores the received call number and the received message signal into the third queuing memory area QM3. Subsequently, operation turns back to the first stage ST1.

At the fourteenth stage ST14, the controller 46 controls the input section 43 to make the input section 43 supply the invalid tone signal to the telephone network 41 as mentioned before. In this event, the call is rejected. Then, operation turns back to the first stage ST1.

Figure 9:
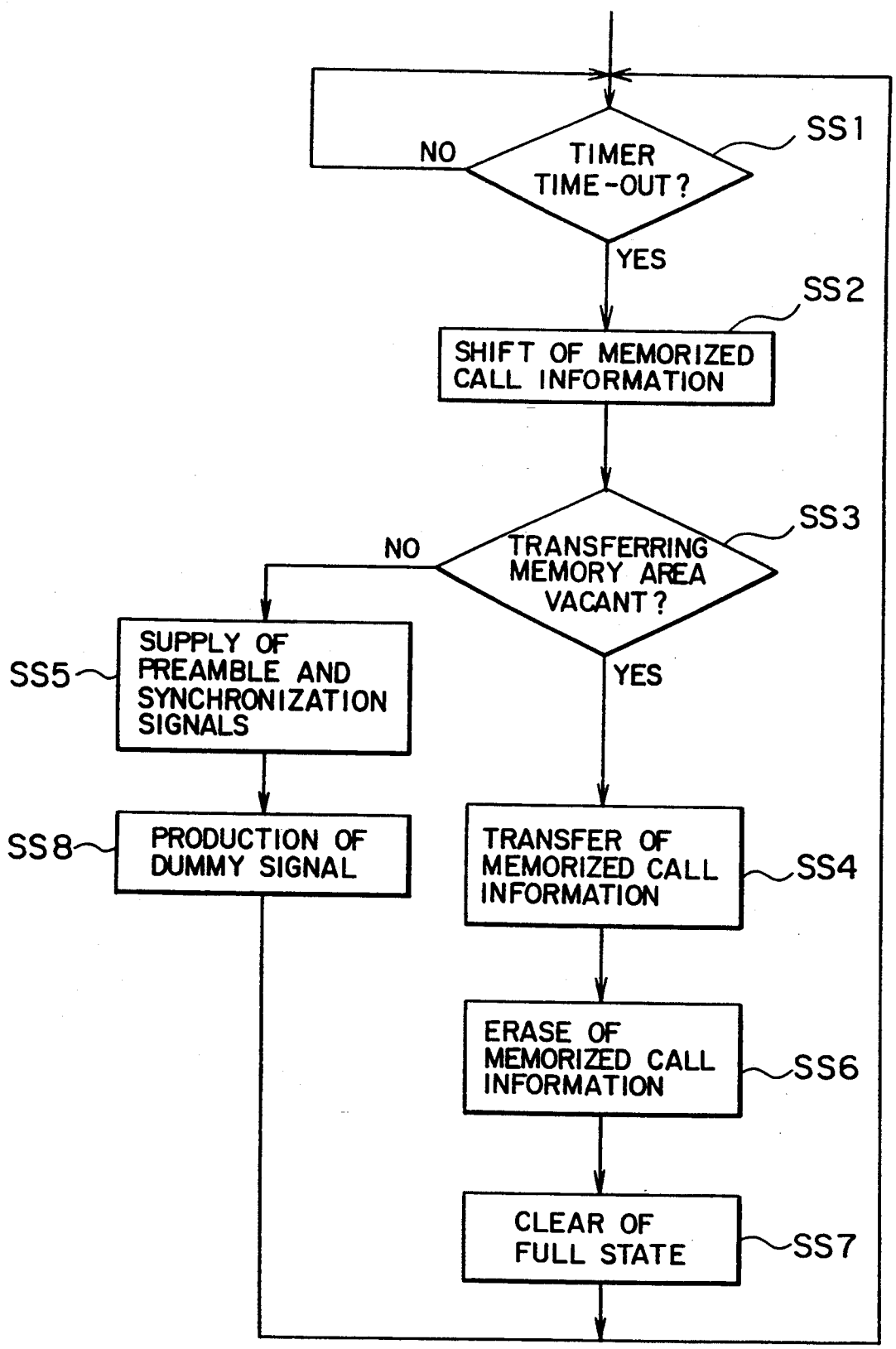
FIG. 9 is a flow chart for use in describing another control operation carried by the controller mentioned in connection with FIG. 8.

Turning to FIG. 9 with reference to FIG. 7 continued, the description will proceed to output operation of the processed signal. The output operation is carried out by the controller 46 in cooperation with the queuing buffer memory 44, the information processor 45 and the timer 48. Let each of the first through the third queuing memory areas QM1 to QM3 already memorize first through third memorized information, respectively. Similarly, the transferring memory area TM already memorizes a fourth memorized information.

At a first stage SS1 of the output operation, the controller 46 detects whether or not the timer 48 produces the time-out signal. When the timer 48 does not yet produce the time-out signal, the first stage SS1 is repeated. If the timer 48 produces the time-out signal, operation proceeds to a second stage SS2.

At the second stage SS2, the controller 46 shifts the first memorized information from the first queuing memory area QM1 to the transferring memory area TM and shifts the fourth memorized information from the transferring memory area TM back to the third queuing memory area QM3. Similarly, the controller 46 shifts the third memorized information from the third queuing memory area QM3 to the second queuing memory area QM2 and the second memorized information from the second queuing memory area QM2 to the first queuing memory area QM1. As a result, the first through the third queuing memory areas QM1 to QM3 memorize the fourth, the third, and the second memorized information as first through third shifted information, respectively. Similarly, the transferring memory area TM memorizes the first memorized information as fourth shifted information.

At a third stage SS3, the controller 46 decides whether or not the transferring memory area TM memorizes at least one of the call number and the message signal. If the transferring memory area TM memorizes the fourth shifted information comprising one of the call number and the message signal, operation proceeds to a fourth stage SS4. When the transferring memory area TM memorizes none of the call number and the message signal, operation proceeds to a fifth stage SS5. The third stage SS3 is for detecting repeatedly at the predetermined period T whether or not the call information is memorized in the transferring memory area TM to produce an empty detection signal while the transferring memory area TM memorizes none of the call number and the message signal. Therefore, the third stage SS3 may be called a detecting unit.

At the fourth stage SS4, the queuing buffer memory 44 transfers the fourth shifted information from the transferring memory area TM to the partial processor 50. Supplied with the fourth shifted information, the partial processor 50 processes the fourth shifted information into one of the address signals. Simultaneously, the partial processor 50 is supplied with the preamble and the synchronization signals from the signal generating unit 49. The controller 46 controls the partial processor 50 to make the partial processor 50 consecutively transmit the preamble and the synchronization signals and one of the address signals to the base station 42 in the preamble, the synchronization, and the address including durations collectively as one of the processed signals.

At a sixth stage SS6, the controller 46 erases the fourth shifted information memorized in the transferring memory area TM.

At a seventh stage SS7, the controller 46 resets the busy state in the flag memory area. Subsequently, operation turns back to the first stage SS1.

At the fifth stage SS5, the signal generating unit 49 supplies the preamble and the synchronization signals to the partial processor 50.

At an eighth stage SS8, the controller 46 controls the partial processor 50 to make the partial processor 50 consecutively transmit, during presence of the empty detection signal, the preamble signal, the synchronization signal, and no signal to the base station 42 in the preamble, the synchronization, and the address including durations collectively as a dummy signal rather than as one of the processed signals. The dummy signal will later be taken into account. Then, operation turns back to the first stage SS1. The eighth stage SS8 may be called a partial control unit.

In the manner mentioned above, the control station can produce the processed signals at the first predetermined time period T1 regardless of the congestion state of calls. Furthermore, the control station can produce the processed signals successively at the first predetermined time period T1 without interruption even when the control station is supplied with no call information.

Figure 10:
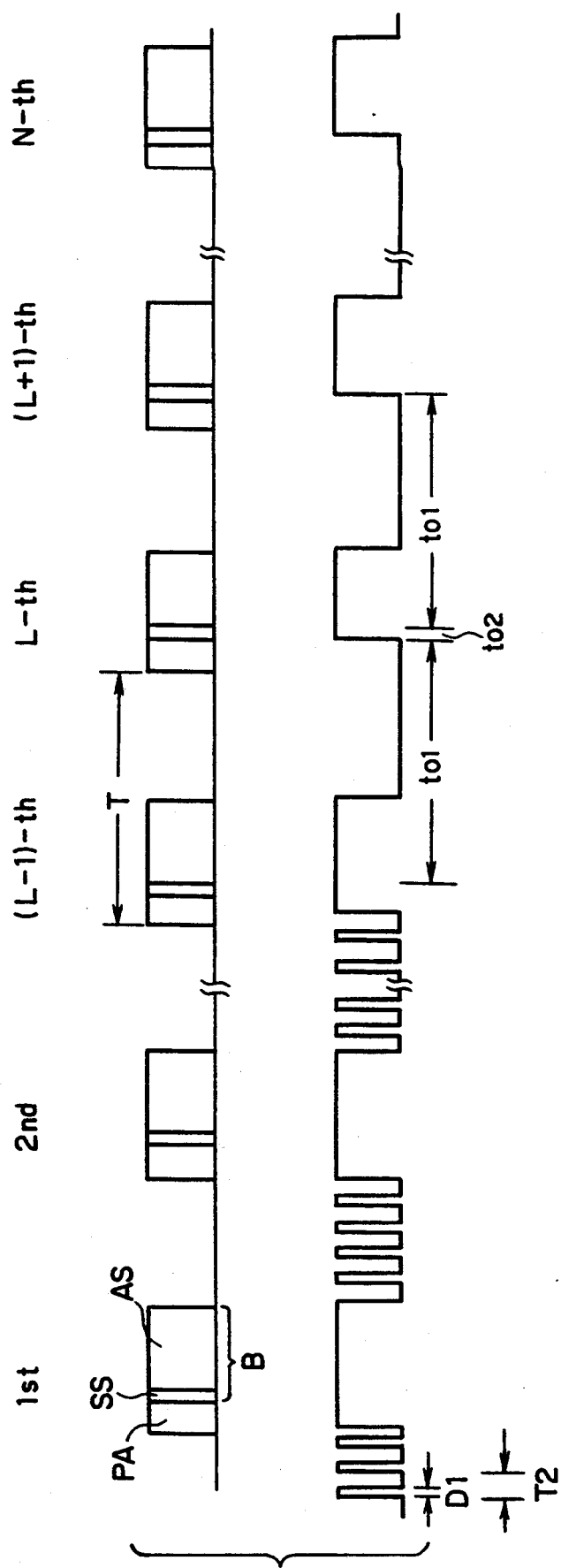
FIG. 10 is a time chart for use in describing a different battery saving operation of the controller mentioned with reference to FIG. 3.

Referring to FIG. 10, a pager receiver is similar in structure to the pager receiver illustrated in FIG. 3. In the brief description of the drawing, the pager receiver is said to be according to the second embodiment of this invention. The controller 30 operates in a following manner.

As illustrated along a top line of FIG. 10, let the pager receiver receive first through (L−1)-th and L-th through N-th pager signals successively at a predetermined time period T, where (L−1) represents a first integer which is less than about ten, (N-L) representing a second integer which is not less than one. Let each of the first through the N-th pager signals comprise the preamble signal PA having the preamble duration and the batch B which is described above. The batch B comprises the synchronization signal SS succeeding the preamble signal PA and having the synchronization duration and the address signal AS succeeding the synchronization signal SS and having the address signal end and the address duration ending at the address duration. A sum of the preamble, the synchronization, and the address durations is not longer than the predetermined time period T.

Figure 11:
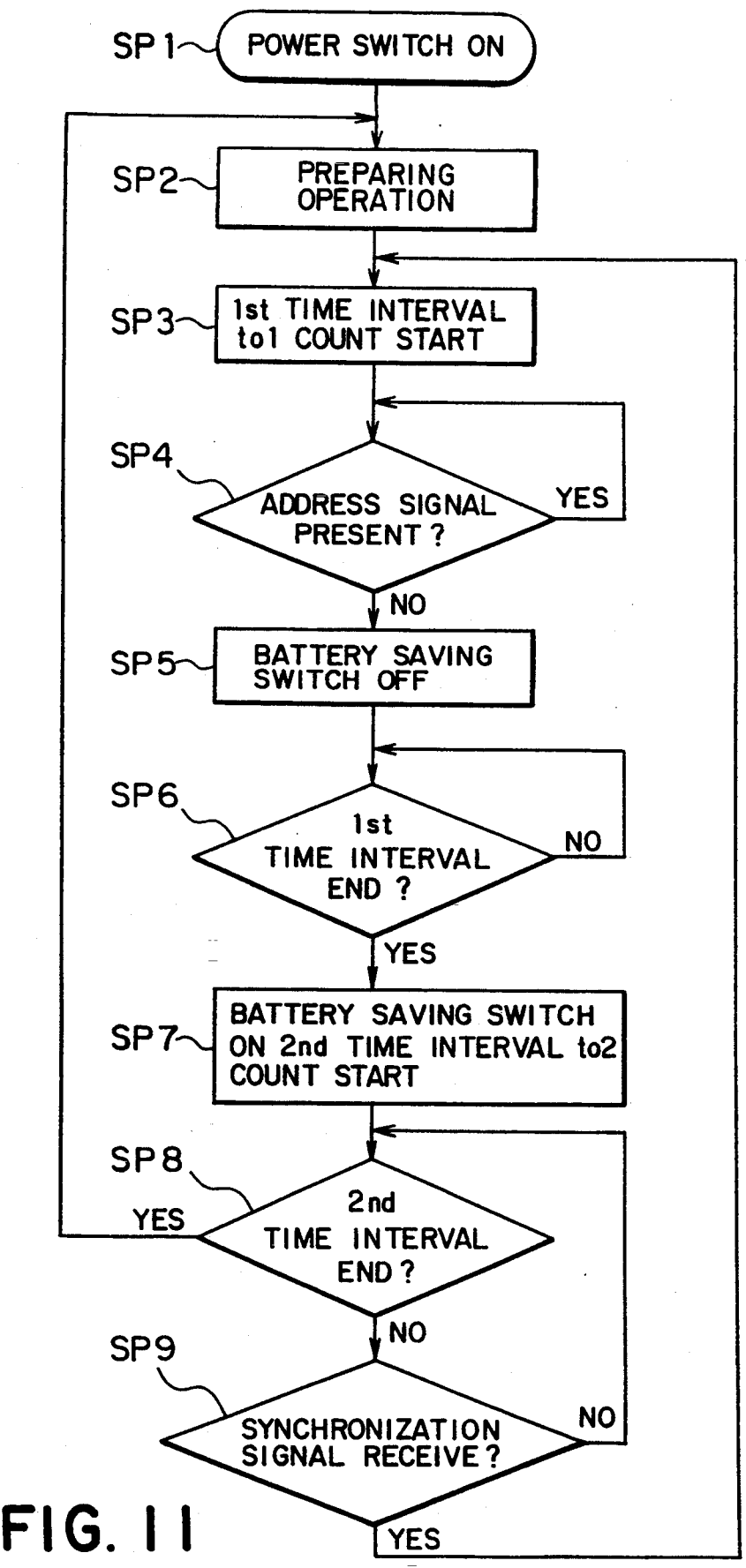
FIG. 11 is a flow chart for use in describing other battery saving operation mentioned in conjunction with FIG. 10.

Referring to FIG. 11 together with FIGS. 3 and 10, the description will be made as regards the battery saving operation.

At a first stage SP1 of this battery saving operation, the power switch SW is turned from the off state to the on state.

At a second stage SP2, preparing operation is carried out as will later be described more in detail. In short, the preparing operation is for determining the predetermined time period T to prepare the receiving circuit 22 for its operation by putting the battery saving switch 23 in the on state to make the receiving circuit 22 receive the synchronization signals of the first through the (L−1)-th pager signals as received signals and detect the address signal end of the (L−1)-th pager signal and to use the received signals in determining the predetermined time period T.

At a third stage SP3, the controller 30 starts time count operation of a first time interval from reception of the synchronization signal of the (L−1)-th pager signal. The first time interval is depicted at t01 along a second line of FIG. 9.

At a fourth stage SP4, the controller 30 decides whether or not the address signal of the (L−1)-th pager signal is present. In other words, the controller 30 detects the address signal end of the (L−1)-th pager signal. If the address signal is present, the fourth stage SP4 is repeated. When either the address signal is absent or the controller 30 detects the address signal end of the (L−1)-th pager signal, operation proceeds to a fifth stage SP5.

At the fifth stage SP5, the controller 30 puts the battery saving switch 23 in the off state.

At a sixth stage SP6, the controller 30 decides whether or not the first time interval t01 is over. When the first time interval t01 does not elapse, the sixth stage SP6 is repeated. If the first time interval t01 is over, operation proceeds to a seventh stage SP7.

At the seventh stage SP7, the controller 30 puts the switch 23 in the on state and starts time count operation of a second time interval. The second time interval is depicted at t02 along the second line of FIG. 10. The second time interval t02 is, for example, 0.125 second long. The first time interval t01 is equal to an algebraic sum of the predetermined period T minus the second time interval t02. The second time interval t02 is longer than the synchronization duration and shorter than twice the synchronization duration.

At an eighth stage SP8, the controller 30 decides whether or not the second time interval t02 is over. If the second time interval t02 is over, operation turns back to the second stage SP2. When the second time interval does not elapse, operation proceeds to a ninth stage SP9.

At the ninth stage SP9, the controller 30 decides whether or not the receiving circuit 22 receives the synchronization signal of the L-th pager signal within the second time interval t02. When the receiving circuit 22 does not receive the synchronization signal of the L-th pager signal within the second time interval, operation turns back to the eighth stage SP8. When the receiving circuit 22 receives the synchronization signal, operation turns back to the third stage SP3.

As is obvious from the above, the third through the ninth stages SP3 to SP9 are for carrying out the battery saving operation. In the battery saving operation, the battery saving switch 23 is put in the on state during the second time interval t02 immediately following the first time interval t01 to make the receiving circuit 22 receive the synchronization and the address signals of each signal of the L-th through the N-th pager signals and detect the address signal end of the each signal. Furthermore, the battery saving switch 23 is put in the off state from detection of the address signal end of the each signal until lapse of the first time interval t02 from reception of the synchronization signal of the each signal. The third through the ninth stages SP3 to SP9 may collectively be called a switch operating unit.

Figure 12:
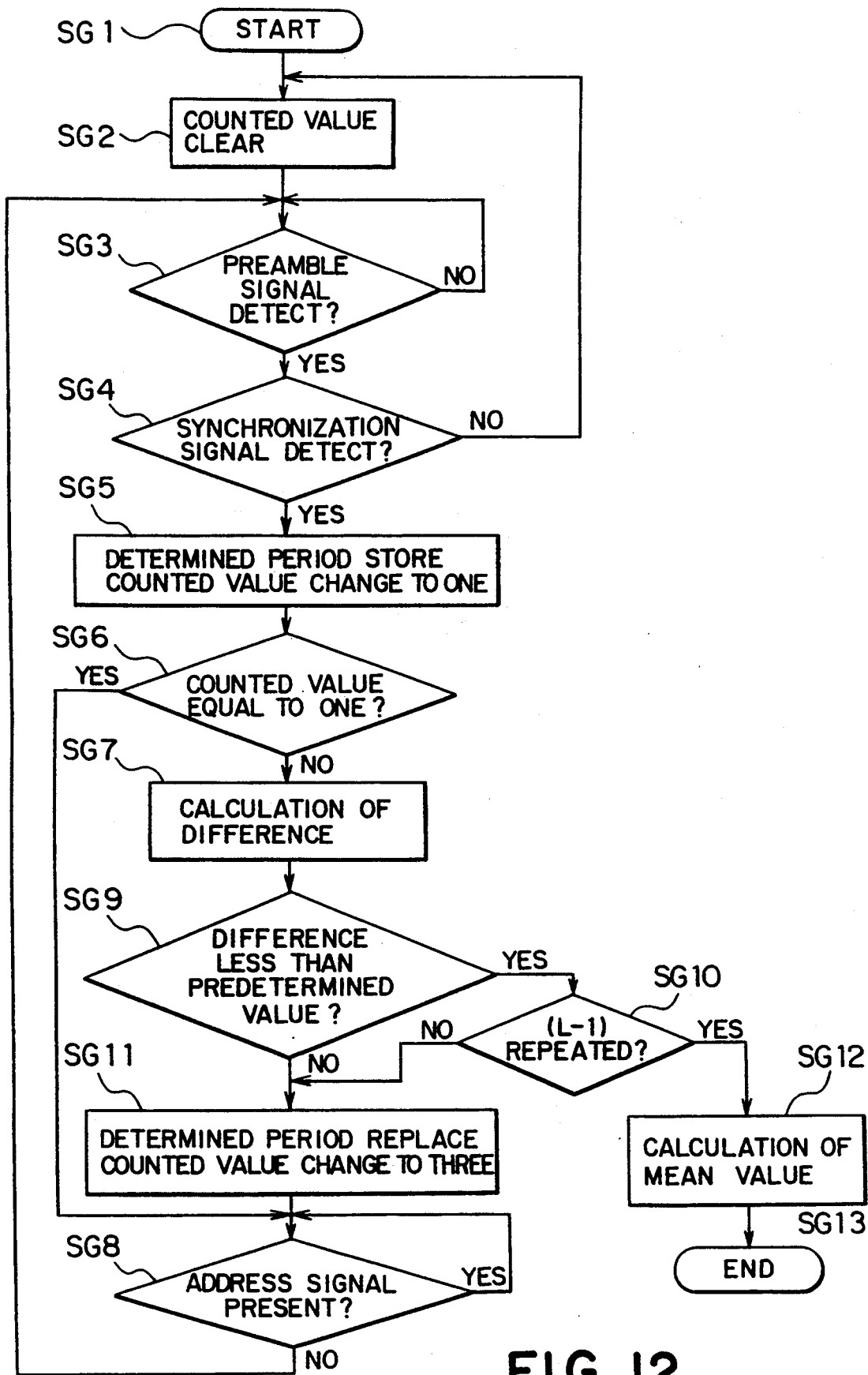
FIG. 12 is a flow chart for use in describing preparing operation which is included in the different battery saving operation illustrated in FIG. 10.

Turning to FIG. 12, the description will proceed to the preparing operation for determining the predetermined time period T. In the preparing operation, the controller 30 repeats period determining operation (L−2) times by detecting the synchronization signal of the first through the (L−1)-th pager signals. In short, the predetermined period T is determined by detecting an interval between one of the synchronization signal and a next one of the synchronization signal. Therefore, the period determining operation starts from reception of the synchronization signal of the second pager signal. The Controller 30 counts the number of the period determining operation as a counted value.

At a first stage SG1 of the preparing operation, the controller 30 starts the period determining operation.

At a second stage SG2, the controller 30 sets the counted value at zero.

At a third stage SG3, the controller 30 decides whether or not the preamble signal of the second pager signal is received. When the preamble signal is not received, the third stage SG3 is repeated. If the preamble signal is received, operation proceeds to a fourth stage SG4.

At the fourth stage SG4, the controller 30 decides whether or not the synchronization signal of the second pager signal is received. When the synchronization signal is not received, operation turns back to the second stage SG2. If the synchronization signal is received, operation proceeds to a fifth stage SG5.

At the fifth stage SG5, the controller 30 determines the predetermined period T, as a first determined period, by detecting the interval between the synchronization signals of the first and the second pager signals. The controller 30 stores the first determined period in the random access memory mentioned before. Simultaneously, the controller 30 counts up the counted value to one.

At a sixth stage SG6, the controller 30 decides whether or not the counted value is equal to one. When the counted value is not equal to one, operation proceeds to a seventh stage SG7. If the counted value is equal to one, operation proceeds to an eighth stage SG8. At this moment, operation proceeds to the eighth stage SG8 because the counted value is equal to one.

At the eighth stage SG8, the controller 30 decides whether or not the address signal of the second pager signal is present. If the address signal is present, the eighth stage SG8 is repeated. When the address signal is absent, operation turns back to the third stage SG3.

At the third stage SG3, the controller 30 decides whether or not the preamble signal of the third pager signal is received. When the preamble signal is not received, the third stage SG3 is repeated. If the preamble signal is received, operation proceeds to the fourth stage SG4.

At the fourth stage SG4, the controller 30 decides whether or not the synchronization signal of the third pager signal is received. When the synchronization signal is not received, operation turns back to the second stage SG2. If the synchronization signal is received, operation proceeds to the fifth stage SG5.

At the fifth stage SG5, the controller 30 determines the predetermined period T, as a second determined period, by detecting the interval between the synchronization signals of the second and the third pager signals. The controller 30 stores the second determined period in the random access memory. Simultaneously, the controller 30 changes the counted value to two.

At the sixth stage SG6, the controller 30 decides whether or not the counted value is equal to one. When the counted value is not equal to one, operation proceeds to the seventh stage SG7. If the counted value is equal to one, operation proceeds to the eighth stage SG8. At this moment, operation proceeds to the seventh stage SG7 because the counted value is equal to two.

At the seventh stage SG7, the controller 30 calculates a first difference between the first and the second determined periods.

At a ninth stage SG9, the controller 30 decides whether or not the first difference is less than a predetermined value. When the first difference is less than the predetermined value, operation proceeds to a tenth stage SG10. If the first difference is not less than the predetermined value, operation proceeds to an eleventh stage SG11.

At the eleventh stage SG11, the controller 30 stores the second determined period in the random access memory as a previously determined period. This means that the second determined period is stored in the random access memory in place of the first determined period. Simultaneously, the controller 30 changes the counted value to three. Then, operation proceeds to the eighth stage SG8.

At the tenth stage SG10, the controller 30 decides whether or not the period determining operation is repeated $(L-1)$ times. When the number of the period determining operation does not reach the $(L-1)$ times, operation proceeds to the eleventh stage SG11. If the period determining operation is repeated the $(L-1)$ times, operation proceeds to a twelfth stage SG12.

At the twelfth stage SG12, the controller 30 calculates an arithmetic mean value of the first through an $(L-1)$-th determined periods.

At a thirteenth stage SG13, the preparing operation comes to an end.

Figure 13:
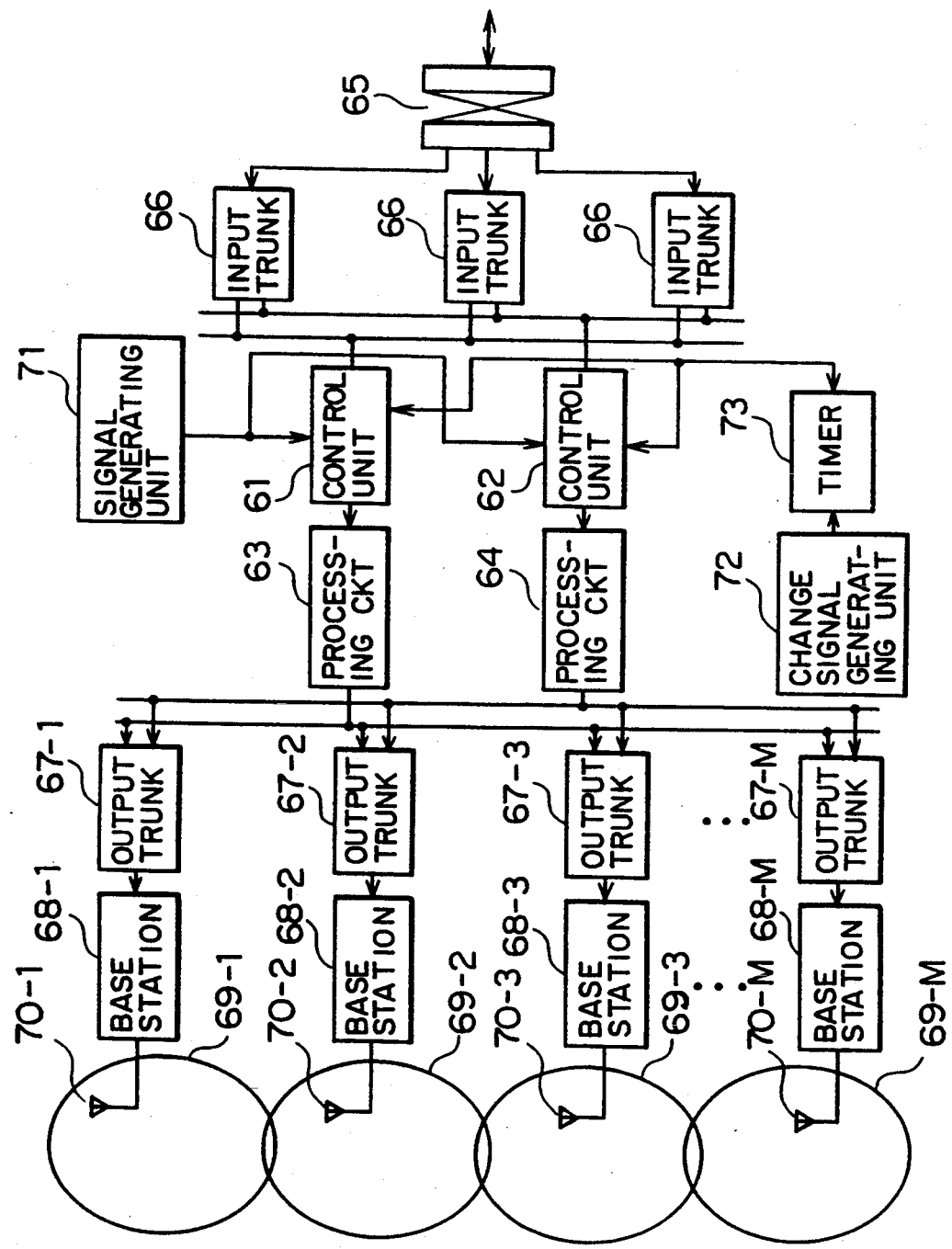
FIG. 13 is a block diagram of a control station according to a fourth embodiment of this invention.
Figure 14:
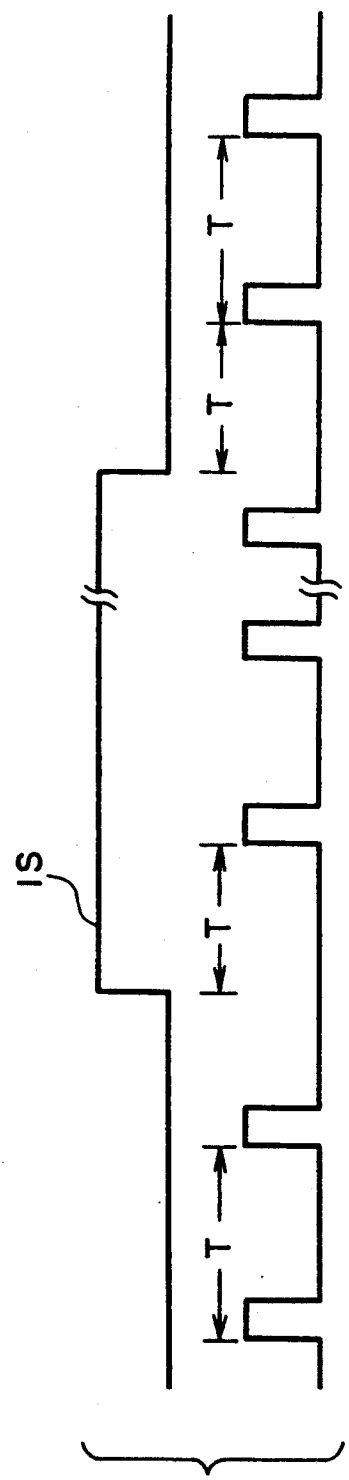
FIG. 14 is a time chart for use in describing operation of the controller mentioned in conjunction with FIG. 13.
Figure 15:
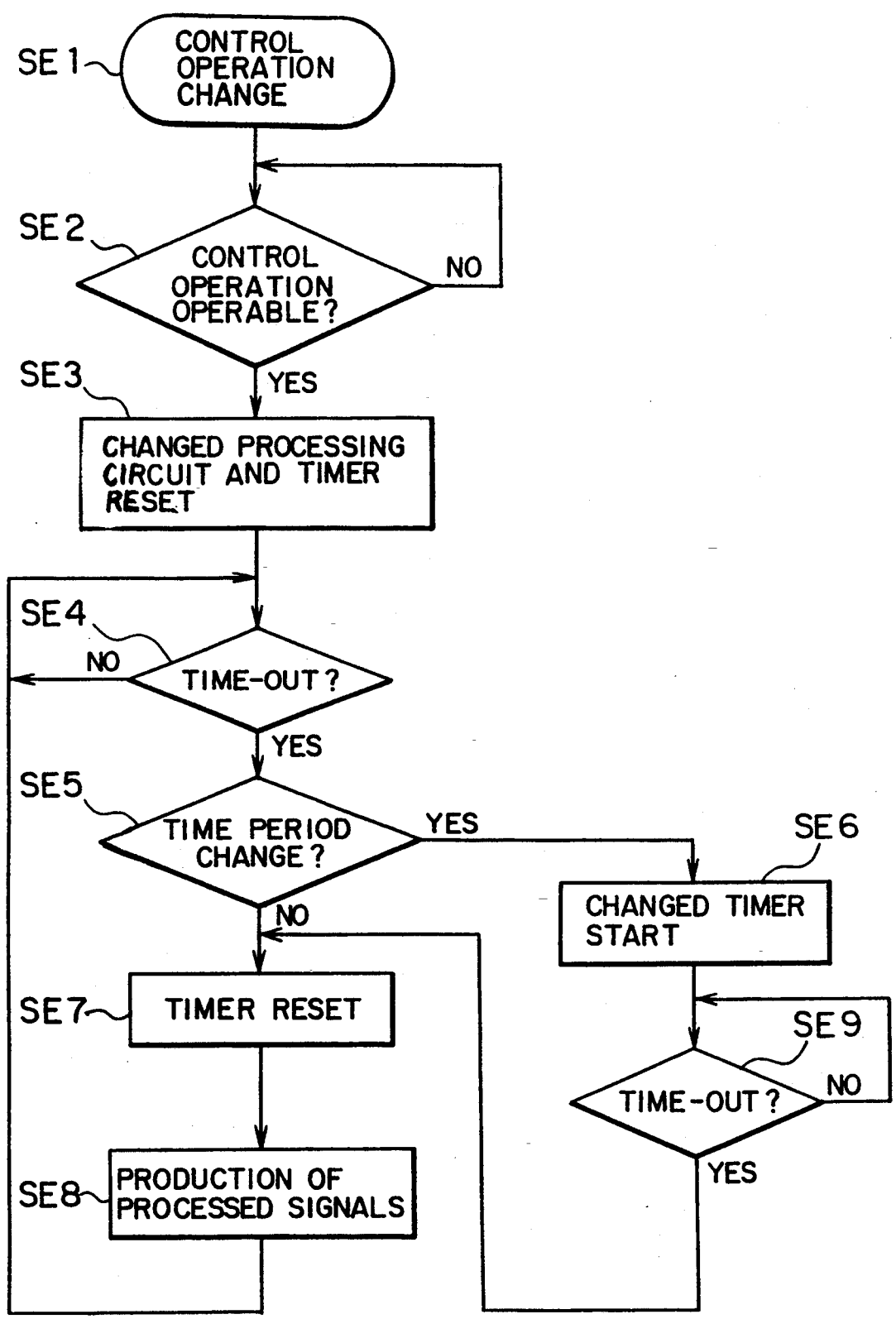
FIG. 15 is a flow chart for use in describing operation of a controller of a processing unit illustrated in FIG. 12.

Referring to FIGS. 13 and 14, the description will be made as regards a control station according to a fourth embodiment of this invention. The control station is useful for the pager receiver 20 described in conjunction with FIGS. 10 to 12. The control station 60 comprises an active and a backup control units 61 and 62 each of which is similar in structure and operation to each other. The control station 60 further comprises an active and a backup processing circuits 63 and 64. Each of the active and the backup processing circuits 63 and 64 is similar in structure and operation to each other. Each of the active and the backup control units 61 and 62 is connected to a telephone network 65 through a plurality of input trunks 66 and supplied with the call information from the telephone network 65. The control units 61 and 62 may collectively be called a control unit depending on the circumstances.

Each of the active and the backup processing circuits 63 and 64 is connected to first through M-th output trunks 67-1 to 67-M. The first through the M-th output trunks 67-1 to 67-M are connected to first through M-th base stations 68-1 to 68-M, respectively, which have first through M-th service areas 69-1 to 69-M, respectively. Each of the active and the backup processing circuits 63 and 64 is for processing the call information into processed signals successively at the predetermined time period T to make the first through the M-th base stations 68-1 to 68-M transmit the processed signals as the pager signals.

The control station further comprises a signal generating unit 71 for generating an instruction signal.

In FIG. 13, the instruction signal is indicated at IS along a first line. As will later be described, the instruction signal is for putting a selected one of the active and the backup processing circuits 63 and 64 into operation. For example, when the instruction signal is present, the active control unit 61 puts the active processing circuit 63 into operation of producing the processed signals while the backup control unit 62 puts the active processing circuit 64 out of operation of producing the processed signals. On the contrary, when the instruction signal is absent, the active control unit 61 puts the active processing circuit 63 out of operation of producing the processed signals while the backup control unit 62 puts the active processing circuit 64 into operation of producing the processed signals. It should be noted here that the predetermined time period T repeatedly follows one after another as a succession of predetermined time periods. As illustrated at a left-hand part along a second line, the active processing circuit 63 is put into operation upon start of one of the predetermined periods that starts in the succession earliest after appearance of the instruction signal IS. As illustrated at a right-hand part of the second line, the backup processing circuit 64 is put into operation upon start of one of the predetermined periods that start in the succession earliest after disappearance of the instruction signal IS.

For brevity, the description will be made only as regards the active backup control unit 61 and the active processing circuit 63. When supplied with the call information, the active backup control unit 61 carries out collation operation, such as a subscriber collation and a service menu collation, in the manner known in the art. After the collation operation, the active backup control unit 61 supplies the call information to the active processing circuit 63 and controls the active processing circuit 63. Supplied with the call information, the active processing circuit 63 processes the call information into processed signals in the manner described in conjunction with FIG. 7. The processing circuit 63 delivers the processed signals successively at the predetermined time period T to the first through the M-th base stations 68-1 to 68-M through the first through the M-th output trunks 67-1 to 67-M. The first through the M-th base stations 68-1 to 68-M transmit the processed signals as the pager signals through first through M-th transmitting antennas 70-1 to 70-M, respectively.

The control station 60 further comprises a change signal generating unit 72 for generating a change indication signal. The control station 60 further comprises a timer 73 for timing the predetermined time period T to make each of the active and the backup control units 61 and 62 put each of the active and the backup processing circuits 63 and 64 into operation at the predetermined period T. The timer 73 changes the predetermined time period T to a prescribed time period T' when supplied with the change indication signal. From disappearance of the change indication signal, each of the active and the backup control units 61 and 62 puts the active and the backup processing circuits 63 and 64 into operation of producing the processed signals successively at the prescribed time period T' when the prescribed time period T' starts earliest from disappearance of the change indication signal. It should be noted here that the predetermined period repeatedly follows one after another as a succession of predetermined time periods. Each of the active and the backup processing circuits 63 and 64 is put into operation upon start of one of the predetermined periods that starts in the succession earliest after disappearance of the change indication signal. The prescribed time period T' should be longer than the second timer interval t02 to make the pager receiver detect the synchronization signal as described in conjunction with FIGS. 10 and 11. The timer 73 may count a time period longer than the predetermined time period T in place of the predetermined time period T.

Referring to FIG. 14 together with FIG. 13, the description will be directed to control operation of the active and the backup control units 61 and 62.

At a first stage SE1 of the control operation, let the signal generating unit 71 stop generation of the instruction signal IS. In this event, the control operation is changed from the active control unit 61 to the backup control unit 62.

At a second stage SE2, the backup control unit 62 decides whether or not the control operation is operable. When the control operation is not operable, the second stage SE2 is repeated. If the control operation is operable, operation proceeds to a third stage SE3.

At the third stage SE3, the backup control unit 62 resets operation of the backup processing circuit 64 and resets the timer 73.

At a fourth stage SE4, the backup control unit 62 decides whether or not the timer 73 counts up the predetermined time period T. If the timer 73 does not count up the predetermined time period T, the fourth stage SE4 is repeated. When the timer 73 counts up the predetermined time period T, operation proceeds to a fifth stage SE5.

At the fifth stage SE5, the backup control unit 62 decides whether or not the change indication signal is generated. When the change indication signal is generated, operation proceeds to a sixth stage SE6. If the change indication signal is not generated, operation proceeds to a seventh stage SE7.

At the seventh stage SE7, the backup control unit 62 again resets the timer 73.

At an eighth stage SE8, the backup control unit 62 controls the backup processing circuit 64 to make the backup processing circuit 64 produce one of the processed signals. Then, operation turns back to the fourth stage SE4. Thereafter, the fourth through the eighth stages SE4 to SE8 are repeated.

At the sixth stage SE6, the timer 73 changes the predetermined time period T to the prescribed time period T'.

At a ninth stage SE9, the backup control unit 62 decides whether or not the timer 73 counts up the prescribed time period T'. If the timer 73 does not count up the prescribed timer period T', the ninth stage SE9 is repeated. When the timer 73 counts up the prescribed time period T' operation proceeds again to the seventh stage SE7.

At the seventh stage SE7, the backup control unit 64 resets the timer 73.

At the eighth stage SE8, the backup control unit 62 controls the backup processing circuit 64 to make the backup processing circuit 64 produce one of the processed signals. Then, operation turns back to the fourth stage SE4. Thereafter, the fourth through the eighth stages SE4 to SE8 are repeated.

According to the above-described control operation, the pager signals can be received correctly by the pager receiver described in conjunction with FIGS. 10 and 11. In other words, the pager receiver can receive the pager signals without error even when one of the active and the backup processing circuits 63 and 64 is changed to another one of the active and the backup processing circuits 63 and 64 and even when the timer 73 changes one of the predetermined and the prescribed time periods T and T' to another one of the predetermined and the prescribed time periods T and T'. When the timer 73 defines the prescribed timer period T', the pager receiver 20 should be put into operation with the prescribed period T' used either as the first predetermined time period T1 or as the predetermined time period T.

While this invention has thus far been described in conjunction with a few embodiments thereof, it will readily be possible for those skilled in the art to put this invention into practice in various other manners. For example, the timer 48 may be included in the controller 46. Similarly, the timer 73 may be included in the active and the backup control units 61 and 62.

What is claimed is:

1. A method comprising the steps of transmitting and receiving call information as address signals in first and second through N-th pager signals arranged successively at a first predetermined period T1, where N represents an integer which is not less than two, each of said address signals having a signal end and an address duration Ta1 ending at said signal end, said transmitting step comprising the sub-steps of:

consecutively arranging in said predetermined period T1 a preamble duration Tp, a synchronization duration Ts, and an address including duration which is longer than said address duration Ta1;

generating a preamble signal having said preamble duration Tp and a synchronization signal having said synchronization duration Ts;

arranging said preamble and said synchronization signals and each of said address signals consecutively in said preamble, said synchronization, and said address including durations collectively as each of said paper signals;

said receiving step comprising the sub-steps of:

putting a battery saving switch into an on state repeatedly at a second predetermined period T2 shorter than said preamble duration Tp to enable a receiving circuit to receive at least a portion of the preamble signal of said first pager signal;

keeping said battery saving switch in said on state during a prescribed duration D2, after reception of said portion, to enable said receiving circuit to detect the synchronization signal of said first pager signal;

timing a preselected duration D3 from detection of said synchronization signal, said preselected duration D3 being given by:

$$D3 \neq T1 - (Tp - Ts/2);$$

putting said battery saving switch in an off state from detection of the signal end of the address signal of said first paper signal until lapse of said preselected duration D3 from detection of the synchronization signal of said first pager signal to cause the battery saving switch to remain in the off state for each period between receipt of the pager signals;

putting said battery saving switch momentarily in said on state after lapse of said preselected duration D3 to enable said receiving circuit to receive at least a part of said signal of said second through said N-th pager signals;

keeping said battery saving switch in said on state, after reception of said at least a part, to enable said receiving circuit to receive the synchronization and the address signal of said each signal and detect the signal end of the address signal of said each signal;

putting said battery saving switch in said off state from detection of the signal end of the address signal of said each signal until lapse of said preselected duration D3 from detection of the synchronization signal of said each signal.

2. A method comprising the steps of transmitting and receiving call information as address signals in first through (L−1)-th and L-th through N-th paper signals arranged successively at a predetermined period T, where (L−1) represents a first integer which is not less than about ten, (N-L) representing a second integer which is not less than one, each of said address signals having a signal end and an address duration ending at said signal end, said transmitting step comprising the sub-steps of:

consecutively arranging in said predetermined period T a preamble duration, a synchronization duration, and an address including duration which is not shorter than said address duration;

generating a preamble signal having said preamble duration and a synchronization signal having said synchronization duration; and arranging said preamble and said synchronization signals and each of said address signals consecutively in said preamble, said synchronization, and said address including durations collectively as each of said paper signals;

said receiving step comprising the sub-steps of:

putting a battery saving switch into an on state to enable a receiving circuit to receive the synchronization signal of each signal of said first through said (L−1)-th pager signals as received signals and detect the signal end of the address signal of said each signal and to use said received signals in determining a determined period as said predetermined period T;

putting said battery saving switch in an off state from detection of the signal end of the address signal of said (L−1)-th paper signal until lapse of a first time interval t01 from detection of the synchronization signal of said (L−1)-th pager signal, said first time interval t01 being shorter than said predetermined period T, to cause the battery saving switch to remain in the off state for each period between receipt of the pager signals;

putting said battery saving switching said on state during a second time interval t02 immediately following said first time interval t01 to make said receiving circuit receive the synchronization and the address signals of each pager signal of said L-th through said N-th pager signals and detect the signal end of the address signal of said each pager signal, said first time interval t01 being equal to an algebraic sum of said predetermined period T minus said second time interval t02; and putting said battery saving switch in said off state from detection of the signal end of the address signal of said each pager signal until lapse of said first time interval t01 from detection of the synchronization signal of the last-mentioned each pager signal.

3. A pager receiver for receiving first and second through N-th pager signals successively at a first predetermined period T1, where N represents an integer which is not less than two, each of said paper signals comprising a preamble signal having a preamble duration Tp, a synchronization signal succeeding said preamble signal and having a synchronization duration Ts, and an address signal succeeding said synchronization signal and having an address signal end and an address duration Ta1 ending at said address signal end, a sum of said preamble, said synchronization, and said address durations being shorter than said first predetermined period T1, said receiver including a battery saving switch having an on state and an off state, and a receiving circuit connected to said battery saving switch and enabled while said battery saving switch is in said on state, said receiver comprising:

switch operating means connected to said receiving circuit and said battery saving switch for putting said battery saving switch in said on state repeatedly at a second predetermined period T2 shorter than said preamble duration Tp to make said receiving circuit receive at least a portion of the preamble signal and all of the synchronization and the address signals of said first pager signal and detect the address signal end of said first pager signal, said switch operating means keeping said battery saving switch in said on state to make said receiving circuit receive at least a part of the preamble signal and all of the synchronization and the address signals of each of said second through said N-th pager signals and detect said address signal end of each of said second through said N-th pager signals, said switch operating means putting said battery saving switch in said off state from detection of the address signal end of each signal of said first through said N-th pager signals until lapse of a preselected duration D3 from detection of the synchronization signal of said each signal to cause the battery saving switch to remain in the off state for each period between receipt of the pager signals, said preselected duration D3 being timed from detection of said synchronization signal and being given by:

$$D3 \neq [T]T1 - (Tp - Ts/2).$$

4. A pager receiver as claimed in claim 3, wherein said switch operating means comprises:
   first partial switch operating means connected to said receiving circuit and said battery saving switch for putting said battery saving switch in said on state repeatedly at said second predetermined period T2 to make said receiving circuit receive at least said portion of the preamble signal of said first pager signal and produce a first preamble detection signal;
   second partial switch operating means connected to said receiving circuit, said battery savings switch, and said first partial switch operating means for keeping said battery saving switch in said on state during a prescribed duration D2 from production of said first preamble detection signal to make said receiving circuit detect the synchronization signal of said first pager signal, said second partial switch operating means producing a first synchronization detection signal, said prescribed duration D2 being longer than said synchronization duration;
   timer means connected to said second partial switch operating means for timing said preselected duration D3 from a time instant at which said receiving circuit produces a timer input signal on detection of said synchronization signal;
   third partial switch operating means connected to said receiving circuit, said battery saving switch, and said timer means for putting said battery savings switch, in said on state to make said receiving circuit receive the address signal of said first pager signal and detect the address signal end of said first pager signal, and produce a first end detection signal;
   fourth partial switch operating means connected to said receiving circuit, said battery saving switch, said timer means, and said third partial switch operating means for keeping said battery saving switch in said off state from reception of said first end detection signal until lapse of said preselected duration D3 which is timed by using said first synchronization detection signal as said timer input signal;
   fifth partial switch operating means connected to said receiving circuit, said battery saving switch, and said fourth partial switch operating means for momentarily putting said switch in said on state to make said receiving circuit receive at least a portion of the preamble signal of each pager signal of said second through said N-th pager signals and produce a second preamble detection signal;
   sixth partial switch operating means connected to said receiving circuit, said battery savings switch, and said fifth partial switch operating means for keeping said battery saving switch in said on state during said prescribed duration D2 from reception of said second preamble detection signal to make said receiving circuit receive all of the synchronization and the address signals of said each pager signal and produce a second synchronization detection signal and a second end detection signal;
   seventh partial switch operating means connected to said receiving circuit, said battery saving switch, said timer means, and said sixth partial switch operating means for keeping said battery saving switch in said off state from production of said second end detection signal until lapse of the preselected duration D3 which is timed by using said second synchronization detection signal as said timer input signal; and
   eighth partial switch operating means connected to said receiving circuit, said battery saving switch, and said fifth and said seventh partial switch operating means for putting said battery saving switch in said on state repeatedly at said second predetermined period T2 if no preamble signal is received when said battery saving switch is momentarily put in said on state.

5. A pager receiver for receiving first through (L−1)-th and L-th through N-th pager signals successively at a predetermined period T, where (L−1) represents a first integer which is not less than about ten, (N-L) representing a second integer which is less than about ten, (N-L) representing a second integer which is not less than one, each of said first through said N-th pager signals comprising a preamble signal having a preamble duration, a synchronization signal succeeding said preamble signal and having a synchronization duration, and an address signal succeeding said synchronization signal and having an address signal end and an address duration ending at said address signal end, a sum of said preamble, said synchronization, and said address durations being not longer than said predetermined period T, said receiver including a battery saving switch having an on state and an off state and a receiving circuit connected to said battery saving switch and enabled while said battery saving switch is in said on state, said receiver comprising:
   preparing means connected to said receiving circuit and said battery saving switch for preparing said receiving circuit for its operation by putting said battery saving switch in said on state to make said receiving circuit receive the synchronization signals of said first through said (L−1)-th pager signals as received signals and detect the address signal end of said (L−1)-th pager signal and to use said received signal in determining said predetermined period T, said preparing means putting said battery saving switch in said off state from detection of the address signal end of said (L−1)-th pager signal until lapse of a first time interval t01 from detection of the synchronization signal of said (L−1)-th pager signal, said first time interval t01 being shorter than said predetermined period T; and switch operating means connected to said receiving circuit, said battery saving switch, and said preparing means for putting said battery saving switch in said on state during a second time interval t02 immediately following said first time interval t01 to make said receiving circuit receive the synchronization and the address signals of each signal of said L-th through said N-th pager signals and detect the address signal end of said each signal, said switch operating means putting said battery saving switch in said off state from detection of the address signal end of said each signal until lapse of said first time interval t01 from reception of the synchronization signal of said each signal to cause the battery saving switch to remain in the off state for each period between receipt of the pager signals, said first time interval t01 being equl to an algebraic sum of said predetermined period T minus said second time interval t02.

6. A pager receiver as claimed in claim 5, wherein said second time interval t02 is longer than said synchronization duration and shorter than twice said synchronization duration.

7. A pager receiver as claimed in claim 6, wherein said preparing means comprises:

first timer means connected to said receiving circuit for timing said first time interval t01 from reception of the synchronization signal of said (L−1)-th pager signal to produce a first interval signal representative of said first time interval t01; and zeroth partial switch operating means connected to said receiving circuit, said battery saving switch, and said first timer means for putting said battery saving switch in said on state to make said receiving circuit receive the synchronization signals of said first through said (L−1)-th pager signals as said received signals and detect the address signal end of said (L−1)-th pager signal and to use said received signals in determining said predetermined period T, said zeroth partial switch operating means putting said battery saving switch in said off state from detection of the address signal end until disappearance of said first time interval t01.

8. A pager receiver as claimed in claim 7, wherein said switch operating means comprises:

second timer means connected to said first timer means for timing said second time interval t02 from disappearance of said first interval signal to produce a second interval signal representative of said second time interval t02;

first partial switch operating means connected to said receiving circuit, said battery saving switch, and said first and second timer means for putting said battery saving switch in said on state during presence of said second interval signal to make said receiving circuit receive the synchronization signal of each pager signal of said L-th through said N-th pager signals and to make said first timer means produce said first interval signal;

second partial switch operating means connected to said receiving circuit, said battery saving switch, and said first partial switch operating means for keeping said battery saving switch in said on state after reception of the synchronization signal of said each pager signal to make said receiving circuit receive the address signal of said each pager signal and detect the address signal end of said each pager signal; and third partial switch operating means connected to said receiving circuit, said battery saving switch, said first and said second timer means, and said second partial switch operating means for putting said battery saving switch in said off state from detection of the address signal end of said each pager signal until disappearance of the first interval signal produced by reception of the synchronization signal of said each pager signal and for making said second timer means produce said second interval signal.

* * * * *

UNITED STATES PATENT AND TRADEMARK OFFICE
CERTIFICATE OF CORRECTION

PATENT NO. : 5,430,437
DATED : July 4, 1995
INVENTOR(S) : Toshio Ichikawa et al.

It is certified that error appears in the above-indentified patent and that said Letters Patent is hereby corrected as shown below:

Column 5, line 35 delete "8is", insert --8 is--

Column 10, line 10 delete "$8", insert --S8--

Column 23, line 28 delete "[T]".

Column 25, line 25 delete "equl", insert --equal--

Signed and Sealed this

Fourteenth Day of November, 1995

Attest:

BRUCE LEHMAN

Attesting Officer     Commissioner of Patents and Trademarks